US007136828B1

(12) United States Patent
Allen et al.

(10) Patent No.: US 7,136,828 B1
(45) Date of Patent: Nov. 14, 2006

(54) INTELLIGENT VEHICLE IDENTIFICATION SYSTEM

(75) Inventors: Jim Allen, 779 Peace Church Rd., Wetumpka, AL (US) 36093; William J. Ippolito, Hagerstown, MD (US); Malcolm J. Talley, Wetumpka, AL (US); Stephen B. Hall, Millbrook, AL (US)

(73) Assignee: Jim Allen, Wetumpka, AL (US)

( * ) Notice: Subject to any disclaimer, the term of this patent is extended or adjusted under 35 U.S.C. 154(b) by 1036 days.

(21) Appl. No.: 09/977,937

(22) Filed: Oct. 17, 2001

(51) Int. Cl.
*G06F 17/00* (2006.01)

(52) U.S. Cl. ........................ 705/13; 340/907; 340/928; 340/940; 340/941; 347/40; 235/384

(58) Field of Classification Search .................. 705/13, 705/1; 340/907, 940, 941, 928; 347/40
See application file for complete search history.

(56) References Cited

U.S. PATENT DOCUMENTS

| | | | | |
|---|---|---|---|---|
| 3,705,976 | A * | 12/1972 | Platzman | 235/384 |
| 3,927,389 | A * | 12/1975 | Neeloff | 340/940 |
| 5,173,692 | A * | 12/1992 | Shapiro et al. | 340/943 |
| 5,278,555 | A | 1/1994 | Hoekman | 340/941 |
| 5,339,081 | A | 8/1994 | Jefferis et al. | 342/28 |
| 5,614,894 | A | 3/1997 | Stanczyk | 340/933 |
| 5,617,086 | A * | 4/1997 | Klashinsky et al. | 340/907 |
| 5,717,390 | A * | 2/1998 | Hasselbring | 340/933 |
| 5,764,163 | A * | 6/1998 | Waldman et al. | 340/934 |
| 5,777,565 | A * | 7/1998 | Hayashi et al. | 340/928 |
| 5,900,825 | A | 5/1999 | Pressel et al. | 340/905 |
| 6,040,785 | A | 3/2000 | Park et al. | 340/928 |
| 6,121,898 | A | 9/2000 | Moetteli | 340/933 |
| 6,198,987 | B1 | 3/2001 | Park et al. | 701/1 |
| 6,337,640 | B1 | 1/2002 | Lees et al. | |
| 6,342,845 | B1 * | 1/2002 | Hilliard et al. | 340/941 |
| 6,345,228 | B1 | 2/2002 | Lees et al. | |
| 6,490,443 | B1 * | 12/2002 | Freeny, Jr. | 455/406 |
| 6,744,383 | B1 * | 6/2004 | Alfred et al. | 340/988 |
| 6,764,163 | B1 * | 7/2004 | Anderson et al. | 347/40 |

FOREIGN PATENT DOCUMENTS

| | | | |
|---|---|---|---|
| EP | 577328 A2 * | 1/1994 | |
| WO | PCT/GB00/01206 | 10/2000 | |
| WO | PCT/GB00/01221 | 10/2000 | |

OTHER PUBLICATIONS

Hartje, Ronald L., "Tomorrow's Toll Road", Feb. 1991, Civil Engineering; 61, 2 ps.*
Research Document- Report No. FHWA-IP-90-002, Traffic Handbook, Jul. 1990.

* cited by examiner

*Primary Examiner*—John W. Hayes
*Assistant Examiner*—Freda Nelson
(74) *Attorney, Agent, or Firm*—Pillsbury Winthrop Shaw Pittman LLP

(57) ABSTRACT

An intelligent vehicle identification system that uses inductive loop technology to profile and classify a vehicle. In a tolling industry application, classification of the vehicle is made prior to the vehicle arriving at a payment point in a toll lane in which the vehicle travels. A predetermined fare associated with the classification is then solicited from an operator of the vehicle without efforts from a toll attendant. In a preferred embodiment, the system also includes an intelligent queue loop that verifies the vehicle at the payment point to prevent misclassification due to a second vehicle, e.g., a motorcycle, that changes from a different lane to the toll lane in question.

19 Claims, 26 Drawing Sheets

INTELLIGENT VEHICLE IDENTIFICATION SYSTEM

BACKGROUND

1. Field of the Invention

The present invention relates generally to identification of vehicles, and more particularly, to a system and method for classifying vehicles using inductive loops.

2. Background of the Invention

A standard automatic toll collection system for a highway involves the use of a toll collection station or toll booth positioned between each lane of traffic. Vehicles driving on the highway must pass through a toll lane alongside the toll collection station.

The passage of vehicles by the toll collection stations is monitored with a combination of loop detectors, treadles, or other such devices capable of detecting passing vehicles. These devices provide vehicle classification information after the vehicle has passed a payment point. Although these devices can be used for audit purposes, they do not address the potential for error when an attendant makes a mistake, nor do they address the ability to properly classify all transactions.

In early toll collection systems, attendants were employed to manually collect fares from the operators of vehicles and to regulate the amount of tolls. Utilizing attendants to collect fares involves numerous problems including, but not limited to, the elements of human error, inefficiencies, traffic delays resulting from manually collected tolls, employment costs of toll attendants, and embezzlement or theft of collected toll revenues. As a result, devices have been developed to automatically operate toll collection systems without the need for toll attendants. In these systems, the toll fees paid are a fixed price and are not based upon the number of axles or vehicle type. Accordingly, there is a need for a system and method that can allow collection of different toll rates from different classes or categories of vehicles without user intervention. In other words, there is a need for a toll collection system in which a toll booth attendant need not be present to classify vehicles to apply different amounts of toll charges.

SUMMARY OF THE INVENTION

The present invention uses an arrangement of inductive loops to classify a vehicle. The classification can be used in a number of applications. For example, one application of the present invention is for a toll collection system.

A preferred embodiment of the toll collection system of the present invention comprises at least one signature loop, at least one wheel assembly loop, a loop detector, and an intelligent vehicle identification unit. In conjunction with the loop detector, the signature loop is adapted to indicate changes in electromagnetic field which can be processed to produce initial signature information characterizing a vehicle that is detected by the signature loop. The initial signature information represents changes of inductance which can be interpreted to identify, among other things, one or more of the vehicle's axle count, height of chassis, speed, and axle separation. In conjunction with the loop detector, the wheel assembly loop is adapted to indicate changes in electromagnetic field which can be processed to produce wheel assembly information. The wheel assembly information provides more accurate information regarding the vehicle's wheel assembly. For convenience, the initial signature information and the wheel assembly information are collectively referred to herein as profile information.

Using the profile information, the intelligent vehicle identification unit can associate the vehicle with a predefined vehicle category or class. The predefined vehicle category is retrieved from a vehicle library that is accessible to the intelligent vehicle identification unit. The predefined vehicle category associated with the vehicle is assigned a fare. The fare is then announced to the operator of the vehicle at a payment point along the toll lane. Preferably, classification of the vehicle is complete before the vehicle arrives at the payment point. When the fare is received from the operator, the vehicle is allowed to proceed past the payment point.

In another preferred embodiment, the system of the present invention also includes an intelligent queue loop. The intelligent queue loop can be located at or near the payment point. Preferably, the intelligent queue loop is located prior to or upstream of the payment point. The intelligent queue loop is adapted to indicate changes in electromagnetic field which can be processed to produce another set of signature information ("the subsequent signature information"), which characterizes the vehicle same way the signature loop does. It is preferable that the intelligent queue loop be similar or identical to the signature loop. In one embodiment, the fare is announced to the operator of the vehicle only if the subsequent signature information verifies that the vehicle at the payment point is the same vehicle that was previously detected by the signature loop. Verification is done by comparing the subsequent signature information with the initial signature information. Accordingly, the intelligent queue loop reconfirms that each vehicle is properly classified and an appropriate fare is received. It prevents, for example, a misclassification and throwing off the sequence of numerous vehicles caused by an unclassified motorcycle from an adjacent toll lane moving in line ahead of the vehicle previously classified by the signature loop.

One aspect of this invention relates to an inherent problem with toll payment amount assignment by toll attendants. An intelligent vehicle identification system (IVIS) in accordance with the invention assigns the amount of the toll instead of the toll being assigned by a toll attendant. In other words, this invention can provide and reconfirm vehicle classification and the amount of the payment or fare prior to the vehicle arriving at the payment point. At the payment point, the fare or payment can be received or collected from the operator using a coin-processing mechanism, by a toll attendant, or electronically with or without a toll attendant present. Alternatively, other means for receiving the fare can be used. For example, a transponder equipped with the vehicle can be used to pay for the fare. Other means for receiving the fare can include wireless transfers, payment through an agent, and so on. This makes it possible for an operating toll authority to charge a vehicle using the road on the basis of its vehicle type. Prior to this invention, it was not possible to charge by vehicle type or axle count without a toll attendant present at the payment point. Of course, with the present invention a toll attendant can still be utilized to collect the fare which has been determined by the IVIS of the invention.

Accordingly, when the present invention is used with a toll attendant present, the toll collection process is much faster, more accurate, and reduces the work required by the toll attendant. Thus, the IVIS ensures that each vehicle type is applied to the correct toll category based upon the authority's predetermined criteria rather than relying on the toll attendant's on-the-spot judgment call, which can be erroneous. The IVIS is reliable and consistent. For example, in an embodiment in which video cameras are included as part of the toll collection system, any discrepancies between the payment received and the IVIS assigned fare can be reviewed by video with the transaction record to resolve the discrepancy.

The IVIS can be used on highways, bridges, tunnels, and the like. Many transportation infrastructures have toll collection systems in place to collect revenues, which are used to defray the cost incurred in constructing or maintaining the highway, or to otherwise provide income to the operating entity.

DETAILED DESCRIPTION OF THE INVENTION

Overview of the Invention

It is noted the present invention can be adapted for a large number of different applications. For example, the profile information generated by a classification loop array using the present invention can be used in traffic management and analysis, traffic law enforcement, and toll collection.

Figure 1:
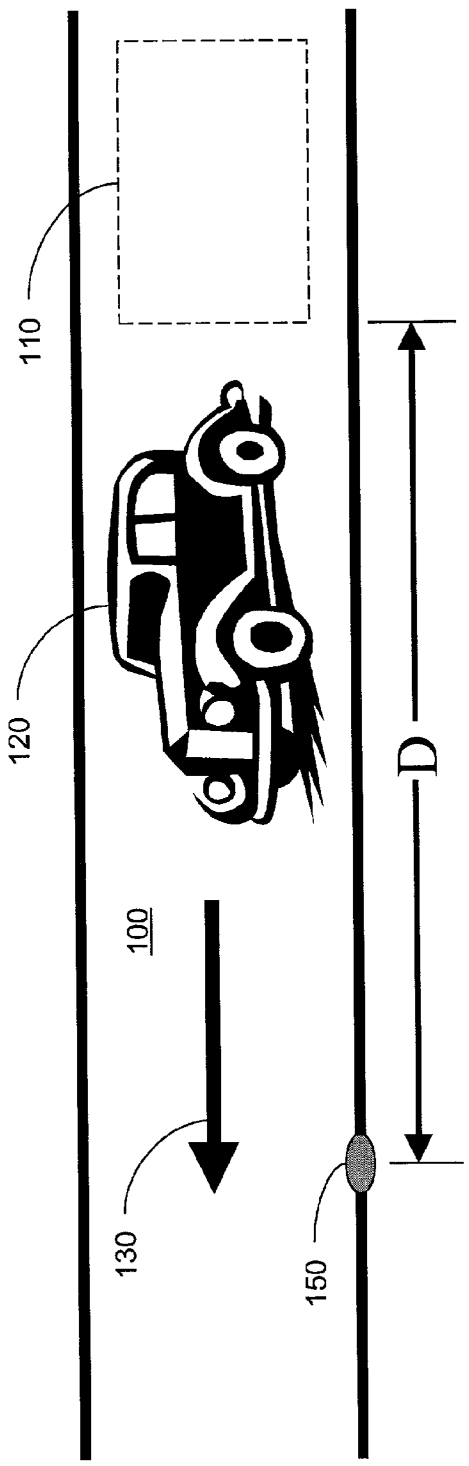
FIG. 1 is a schematic diagram illustrating a vehicle traveling through a path on which a classification loop array of the present invention is located.

FIG. 1 is a schematic diagram illustrating a preferred location of classification loop array 110 of the present invention on the surface of path 100. Path 100 can be, for example, a toll lane, a roadway, an entrance to a parking lot, or any stretch of surface on which vehicle 120 travels in direction 130. Classification loop array 110 is located at a distance D upstream from device 150 along path 100.

Classification loop array 110 comprises at least one signature loop and at least one wheel assembly loop. Briefly, the signature loop is adapted to indicate changes in electromagnetic field which can be processed to produce initial signature information as it detects the presence of vehicle 120 over it. The initial signature information represents changes of inductance which can be interpreted to identify, among other characteristics of vehicle 120, a speed of the vehicle, an axle separation of the vehicle, and a chassis height of the vehicle. The wheel assembly loop is adapted to indicate changes in electromagnetic field which can be processed to produce wheel assembly information as it detects the presence of vehicle 120 over it. The wheel assembly information represents changes of inductance which can be interpreted to identify, among other attributes of vehicle 120, the axle count and the axle separation with increased accuracy and details. Specifically, the wheel assembly loop can detect, among other things, the separation between two successive wheels of vehicle 120 that is traveling in direction 130. The initial signature information and the wheel assembly information, collectively, are also known as profile information of the vehicle.

Device 150 is in communication with classification loop array 110. As discussed below, device 150 can be one of many different devices that can be used in conjunction with classification loop array 110. Although device 150 is shown in FIG. 1 to be located downstream of classification loop array 110 in direction 130, device 150 can be located elsewhere, for example, at a position upstream of classification loop array 110. In another example, device 150 can located next to classification loop array 110. In still another example, device 150 can be at a remote location. Distance D can be any distance depending on specific applications. In a toll collection application in which path 100 is a toll lane, distance D can be between zero and 110 feet. Preferably, distance D is about 65 feet. It is noted that a length of 65 feet is slightly longer than then the length of a typical tractor trailer. The distance D should be increased to about 85 feet to 110 feet for toll lanes that are adapted to accommodate tractor-trailers towing double trailers. Similarly, the distance D can be shorter than 65 feet if tractor trailers are not expected to use path 100.

In a traffic management and analysis application, classification loop array 110 can be arranged such that it can be used to sense movement of vehicle 120 along path 100 in direction 130. For example, path 100 can be a specific stretch of a highway. In this application, device 150 can be, for example, a computer adapted to perform statistical analysis based on data collected by classification loop array 110. Device 150 can, for example, use the data collected by classification loop array 110 to determine the types of vehicles that use the highway, the number of vehicles passing that point each day, the speed of the vehicles, and so on.

In a traffic law enforcement application, classification loop array 110 can be used in conjunction with other devices. For example, device 150 can be a camera that is positioned to take a photograph of the license plate of vehicle 120 if classification loop array 110 detects a speed of vehicle 120 exceeding a speed limit. In still another example, path 100 is a restricted lane that prohibits large vehicles such as tractor trailers and device 150 is a camera used to capture an image of the license plate of vehicle 120 if classification loop array 110 detects the presence of a tractor trailer in path 100.

In a toll collection application in which device 150 is a payment point (e.g., an automated toll collection mechanism), profile information associated with vehicle 120 that is collected by classification loop array 110 can be used to classify vehicle 120 before it arrives at the payment point. The classification can then be used to notify an operator of vehicle 120 about an appropriate fare associated with the classification. In this toll collection application, vehicle 120 is classified and the appropriate fare is determined before it arrives at device 150. More importantly, the classification is made without input from a toll attendant, thereby eliminating human errors associated with classification of vehicles. When vehicle 120 arrives at device 150, the appropriate fare can be collected from the operator. It is noted that device 150 can be replaced by a toll attendant even though in this application the toll attendant does not classify vehicle 120 to determine the fare. In the toll collection application of the present invention, it is preferable that vehicle 120 clears classification loop array 110 (i.e., the entire vehicle 120 must clear classification loop array 110) before vehicle 120 reaches device 150.

Preferred Embodiments for Implementation in a Toll Lane

Figure 1A:
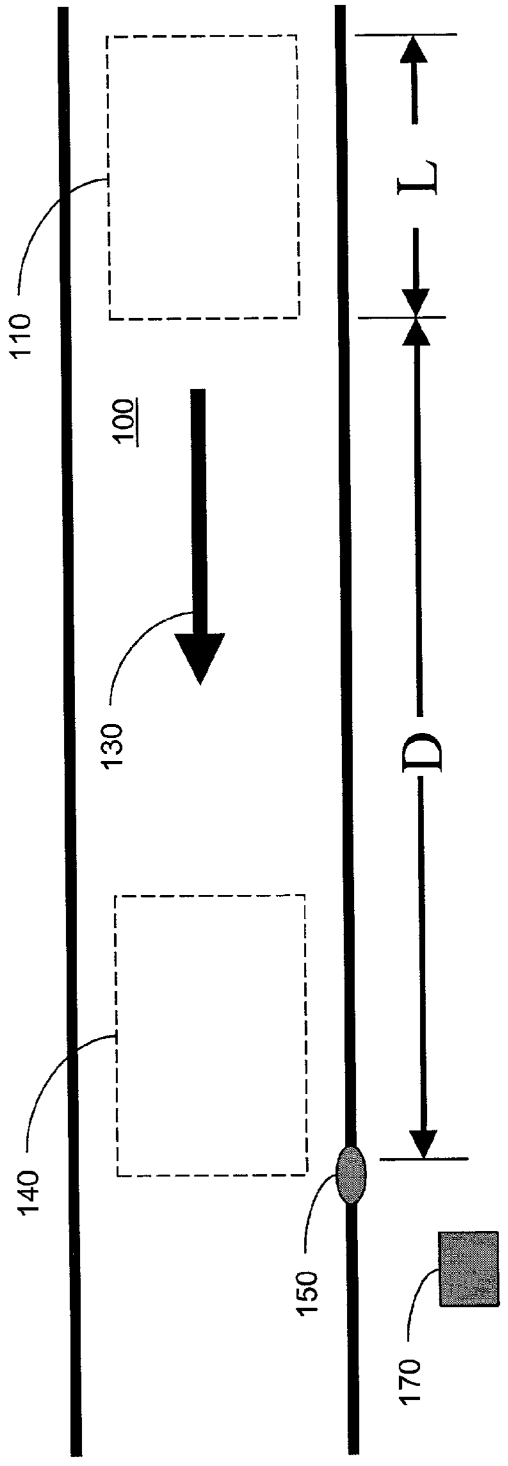
FIG. 1A is a schematic diagram illustrating preferred locations of a classification loop array and an intelligent queue loop.

FIG. 1A is a schematic diagram illustrating the layout of components of another preferred embodiment of the present invention. In this preferred embodiment, path 100 is a toll lane on which vehicle 120 travels in direction 130. Device 150 is a payment point. Classification loop array 110 is located at a distance D upstream of device 150. At or near device 150, intelligent queue loop 140 is located on toll lane 100 downstream of classification loop array 110. Intelligent vehicle identification unit 170 is in communication with classification loop array 110, intelligent queue loop 140, and device 150.

Preferably, classification loop array 110 has a length and a width. The width is preferably wide enough so that no vehicle can travel on toll lane 100 without being detected by classification loop array 110. The length, indicated in FIG. 1A as length L, is preferably between about three and thirty feet. Preferably, classification loop array 110 comprises at least one signature loop that measures six feet by six feet. Intelligent queue loop 140 preferably has a length and width that is similar to the signature loop. In other words, intelligent queue loop 140 is also preferably six feet by six feet.

In this embodiment, the signature loop (not shown in FIG. 1A) of classification loop array 110 is adapted to indicate changes in electromagnetic field which can be processed to produce initial signature information of vehicle 120. Intelligent queue loop 140 is adapted to indicate changes in electromagnetic field which can be processed to produce subsequent signature information of vehicle 120. The initial and subsequent signature information of a common vehicle exhibit similar characteristics on a inductance vs. time plot. Exemplary inductance vs. time plots are shown in FIGS. 6–7,9–11, 13, and 21–25. The Y-axis represents a unit of inductance and the X-axis represents a unit of time. Preferably, the unit of inductance is in kilo-henrys and the unit of time is in milli-seconds.

Figure 8:
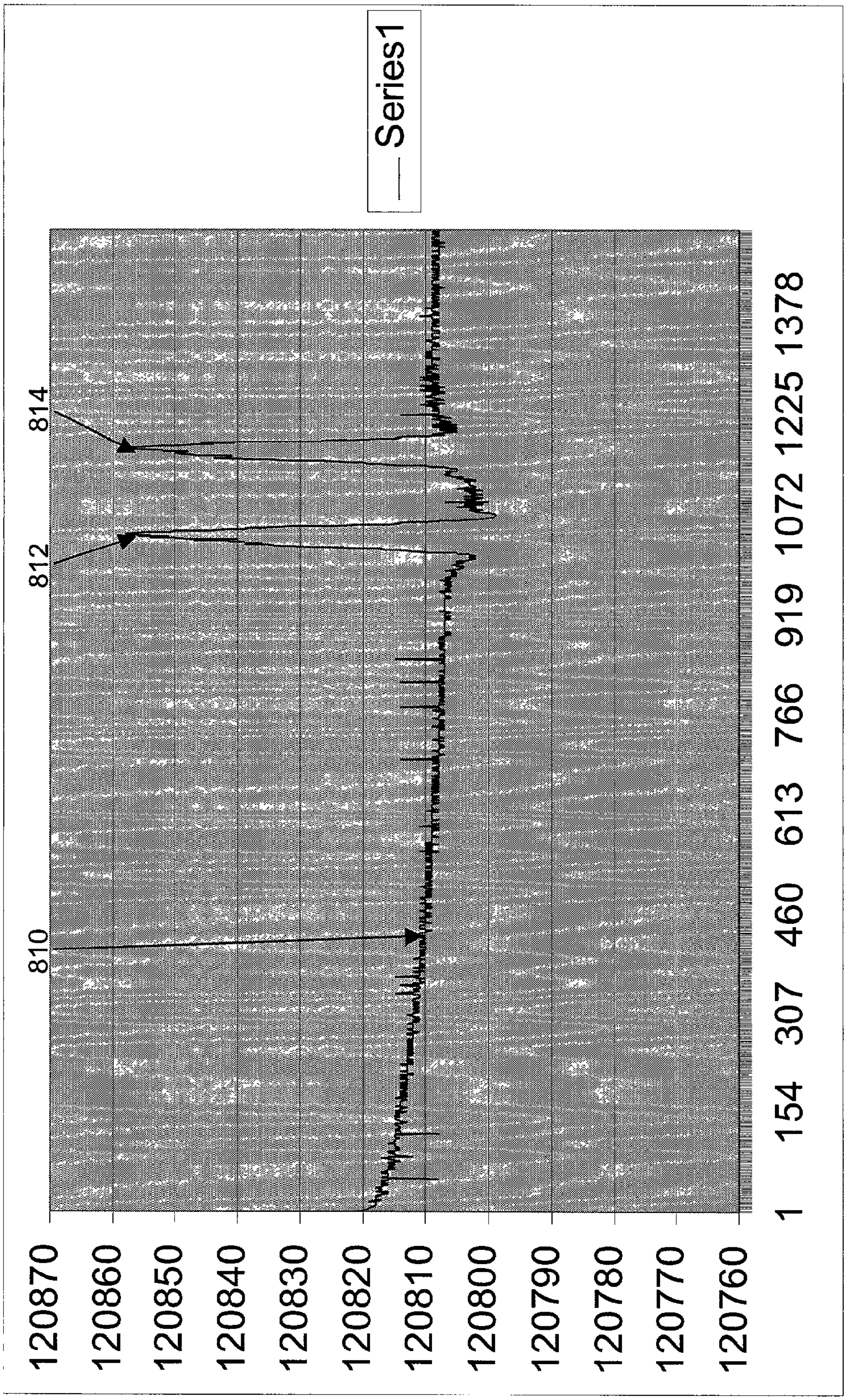
FIG. 8 is an exemplary wheel assembly information of a two-axle vehicle traveling over a wheel assembly loop at ten miles per hour.
Figure 12:
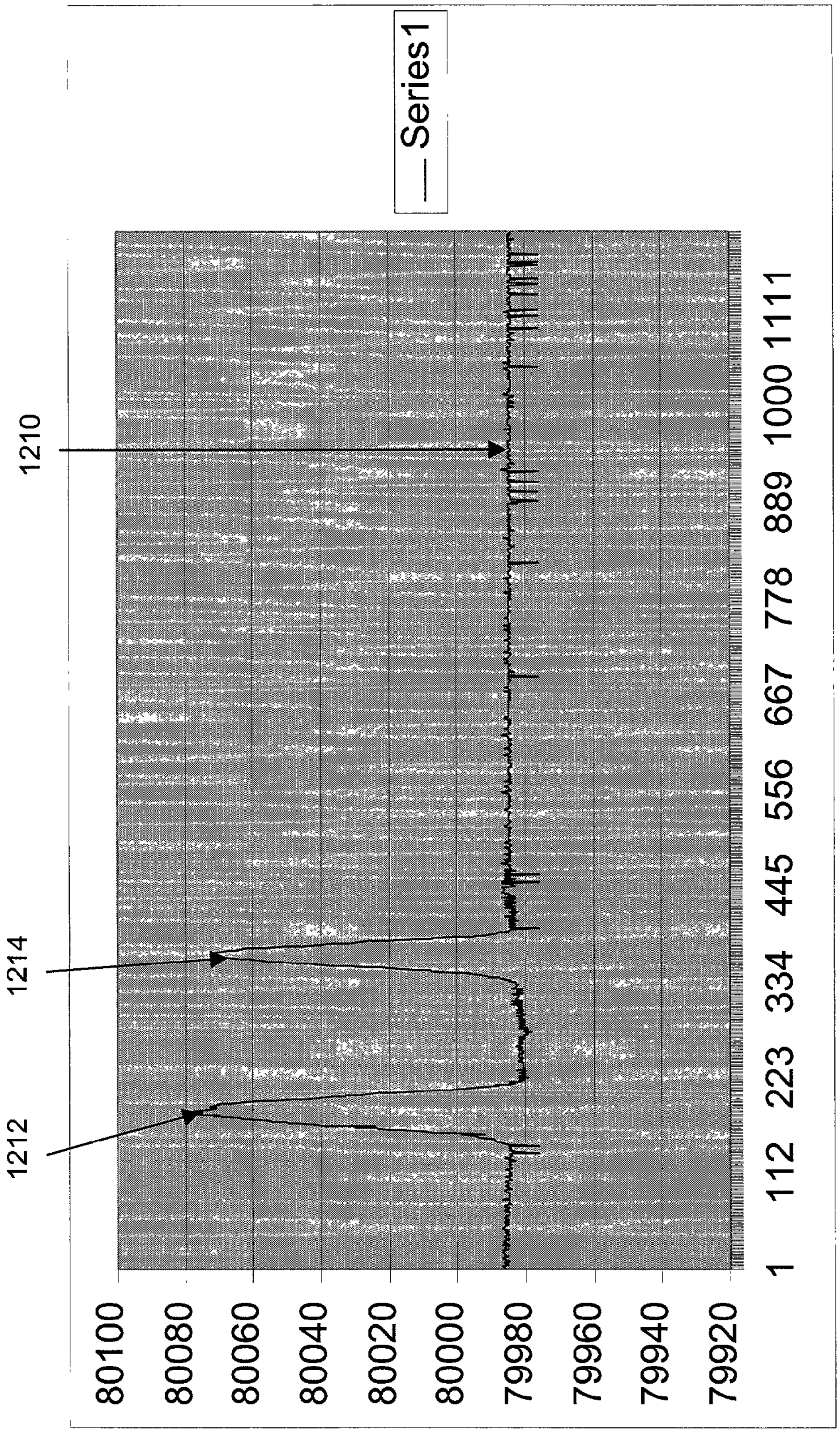
FIG. 12 is an exemplary wheel assembly information of a two-axle vehicle traveling over a wheel assembly loop.
Figure 14:
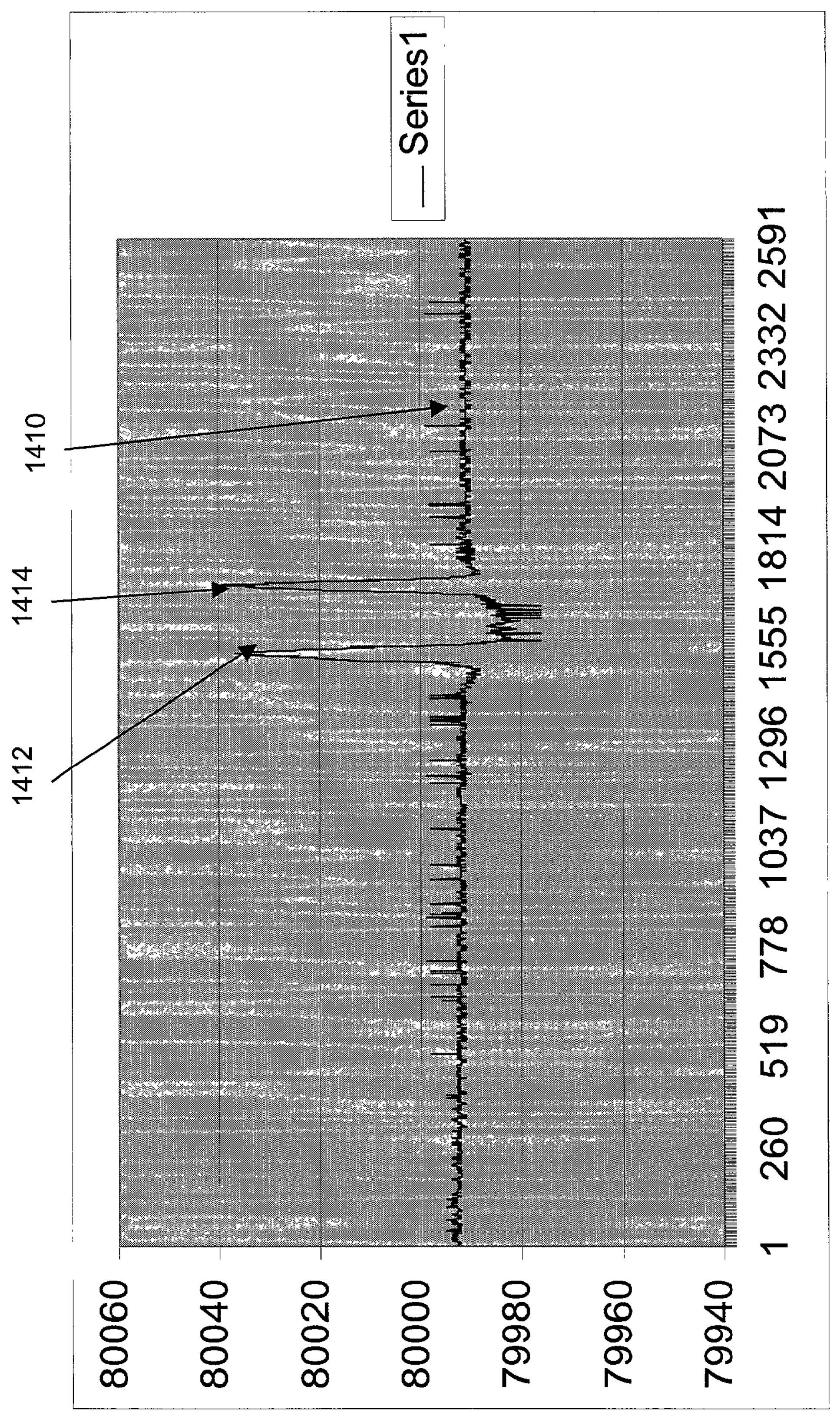
FIG. 14 is another exemplary wheel assembly information of a two-axle vehicle traveling over a wheel assembly loop.

Preferably, classification loop array 110 further comprises at least one wheel axle loop (not shown in FIG. 1A). The wheel axle loop is adapted to indicate changes in electromagnetic field which can be processed to produce wheel assembly information. The wheel assembly information can be represented in an inductance vs. time plot. Exemplary inductance vs. time plots of wheel assembly information is shown in FIGS. 8, 12, and 14.

Intelligent vehicle identification unit 170 is in communication with classification loop array 110, intelligent queue loop 140, and device 150. In the preferred embodiment, when vehicle 120 is traveling over classification loop array 110, profile information of vehicle 120 is generated and provided to intelligent vehicle identification unit 170. As noted above, the profile information represents changes of inductance which can be interpreted to identify, among other characteristics of vehicle 120, an axle count of the vehicle, an axle spacing of the vehicle, a speed of the vehicle, and a chassis height of the vehicle.

As suggested above, the profile information includes initial signature information that is produced based at least in part on data collected by the signature loop of classification loop array 110. Preferably, the profile information also includes wheel assembly information that is produced based at least in part on data collected by the wheel assembly loop. When vehicle 120 travels over intelligent queue loop 140, subsequent signature information is produced based at least in part on data collected by intelligent queue loop 140. The profile information and the subsequent signature information are provided to intelligent vehicle identification unit 170.

If the initial signature information and the subsequent signature information indicate that the vehicle previously detected by classification loop array 110 is now at device 150, intelligent vehicle identification unit 170 notifies the operator of vehicle 120 of the appropriate fare associated with the profile information. In other words, intelligent queue loop 140 verifies that that the vehicle at device 150 is the same vehicle for which the fare was determined from classification loop array 110. This serves to detect if one or more vehicles have disturbed the queue order.

Figure 2:
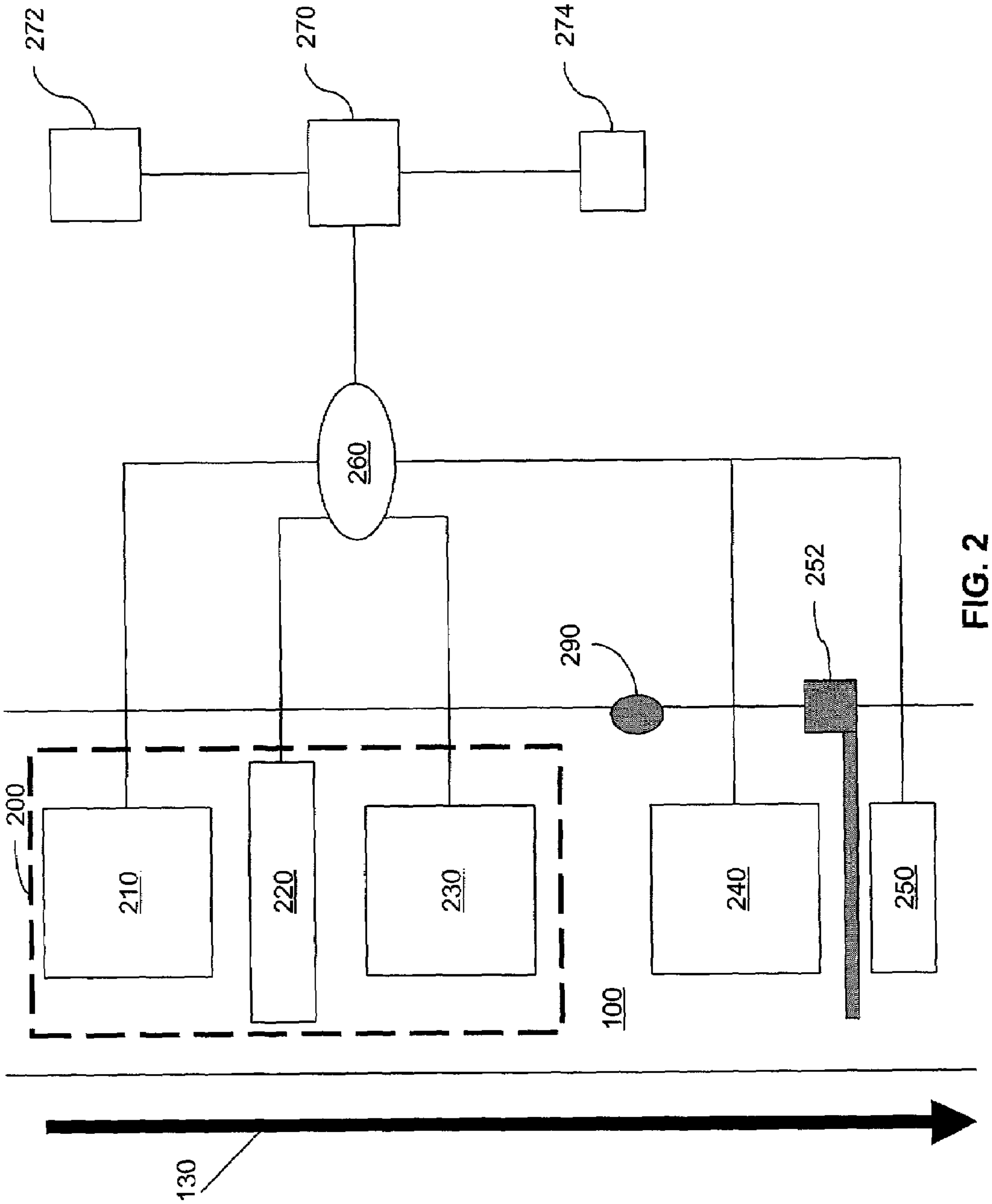
FIG. 2 is a schematic diagram illustrating one embodiment of the present invention as implemented in a toll road application.

FIG. 2 is a schematic diagram illustrating one embodiment of the present invention as implemented in a toll road application. Classification loop array 200 comprises a number of loops, including, for example, one or more signature loops 210 and 230, and at least one wheel assembly loop 220. Signature loops 210 and 230, and wheel assembly loop 220, are arranged such that a vehicle travelling in direction 130 would initially encounter front signature loop 210, and then wheel assembly loop 220, and finally rear signature loop 230.

In addition to classification loop array 200, the preferred embodiment shown in FIG. 2 further comprises intelligent queue loop 240 and gate loop 250. Intelligent queue loop 240 is preferably similar to signature loops 210 and 230 in shape and dimensions. Gate loop 250 is adapted to detect the presence of the vehicle beyond or downstream of toll gate 252. Preferably, toll gate 252 is kept open until the vehicle clears gate loop 250.

Each of front signature loop 210, rear signature loop 230, and intelligent queue loop 240 is preferably generally rectilinear or rectangular in shape. Preferably, each of these loops has two or more turns of wire. The width of each of these loops is preferably six feet. However, the width can be almost as wide as toll lane 100. In an example in which toll lane 100 is 12 feet wide, the width of each of these loops can be between about three feet and about eleven feet. Preferably, each of these loops is a square, in other words, the length of each of these loops is the same as the width. Preferably, each of these loops measures six feet by six feet.

Each of front signature loop 210, rear signature loop 230, intelligent queue loop 240, and gate loop 250 is basically an inductive loop. Each of these loops is used to detect, among other things, a presence of a vehicle over it, the vehicle's chassis height, an axle count of the vehicle, and the movement of the vehicle. Each of these loops preferably produces a flux field or an electromagnetic field that is high enough to be affected by the chassis of each vehicle that uses toll lane 100. The chassis of the vehicle creates eddy currents and disperses the flux field of the loop. This results in lowering the inductance of the loop circuit. One of skill in the art could consult Traffic Detector Handbook, Publication No. FHWA-IP-90-002, which is incorporated herein by reference in its entirety, for further information regarding inductive loops. The loop's detector (e.g., loop detector 260) processes these inductive changes in the loop circuit.

Wheel assembly loop 220 is also an inductive loop. Preferably, wheel assembly loop 220 is adapted to detect the wheel assemblies of the vehicle and to minimize the detection of the chassis of the vehicle and maximize the detection of the axles of the vehicle. Wheel assembly loop 220 is adapted to indicate changes in electromagnetic field which can be processed to produce wheel assembly information.

Intelligent queue loop 240 preferably senses the beginning of the vehicle, the end of the vehicle, the chassis height of the vehicle, and the vehicle's presence over it. Gate loop 250 is preferably adapted to detect the presence of the vehicle. The detection of the vehicle by gate loop 250 controls toll gate 252.

Each of front signature loop 210, wheel assembly loop 220, rear signature loop 230, intelligent queue loop 240, and gate loop 250 is in communication with one or more loop detector 260. Loop detector 260 preferably has a loop signal processor and discriminator unit (LSP&D) (not shown). Preferably, each of front signature loop 210, rear signature loop 230, intelligent queue loop 240, and gate loop 250 can be used to determined signature information including one or more of vehicle presence, vehicle speed, vehicle length, chassis height, and vehicle movement. The signature information, as discussed above, can be represented in an inductance vs. time plot.

Figure 6:
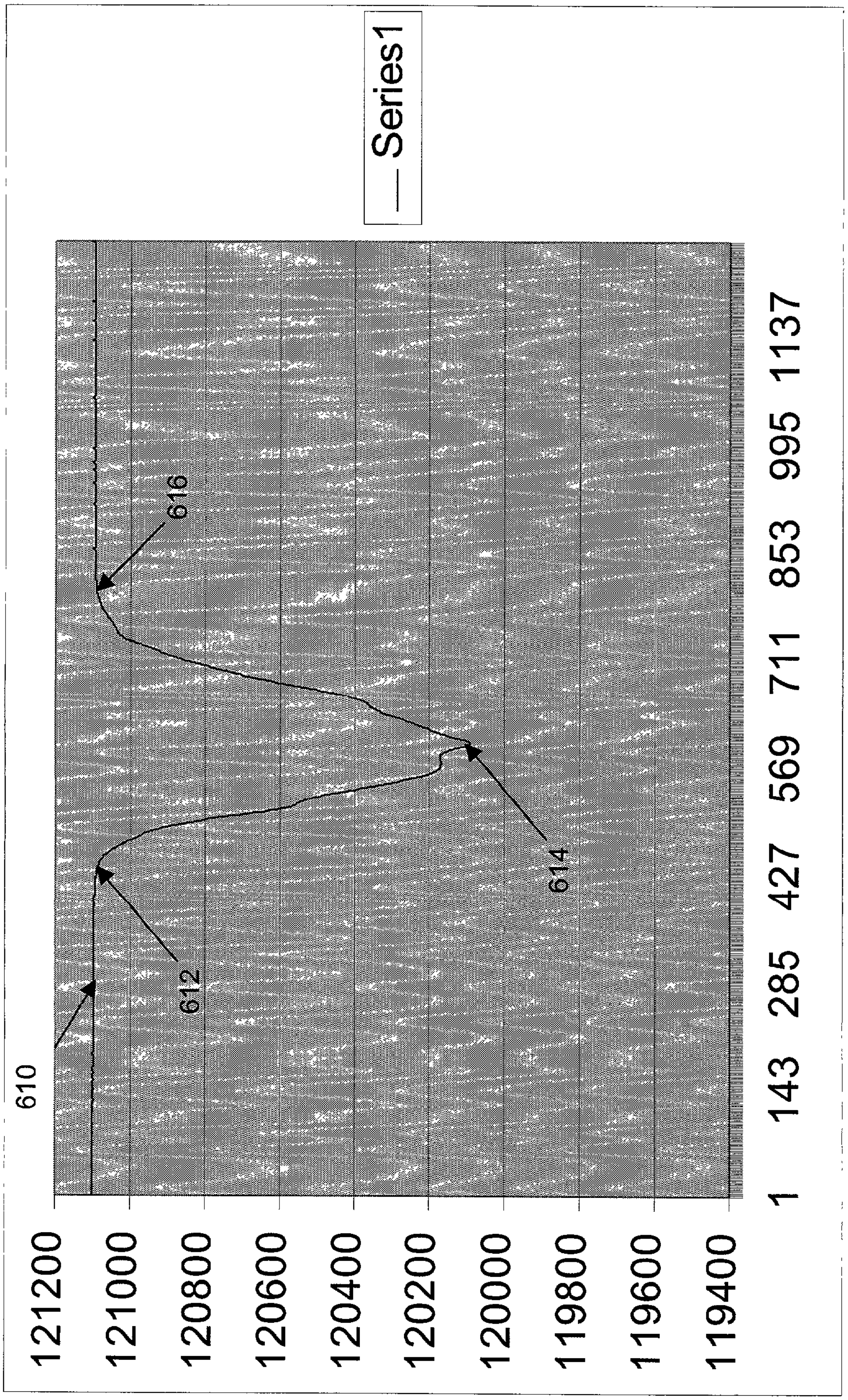
FIG. 6 is an exemplary signature information of a vehicle traveling at a speed of ten miles per hour over a six feet by six feet signature loop.

FIG. 6 is an exemplary signature information of a vehicle traveling at a speed of ten miles per hour over a six feet by six feet signature loop. The speed can be calculated based on the slope of curve 610. Point 612 indicates a moment in time when the vehicle is first detected by the signature loop. Point 614 indicates a moment in time when the vehicle is at the center of the signature loop. Point 616 indicates a moment in time when the vehicle has gone beyond the detection zone of the signature loop.

Figure 7:
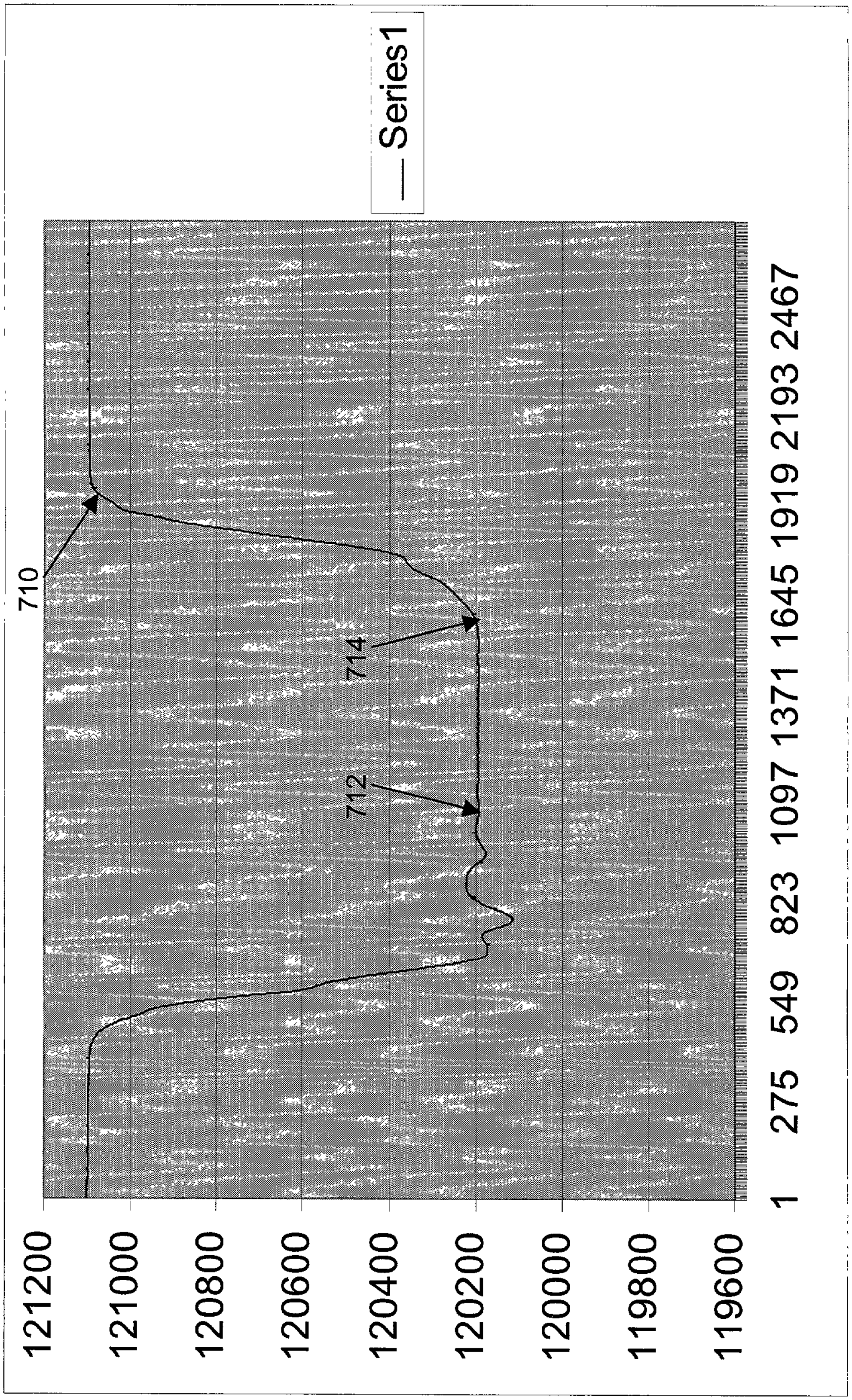
FIG. 7 is another exemplary signature information of the same vehicle that comes to a complete stop at one time over the six feet by six feet signature loop.

FIG. 7 is another exemplary signature information of the same vehicle that comes to a complete stop at one time over the six feet by six feet signature loop. Curve 710 represents the movement of the vehicle over the signature loop. The flat portion of curve 710 between point 712 (at time=1027) and 714 (at time=1606) indicates that the vehicle is stationary.

Figure 9:
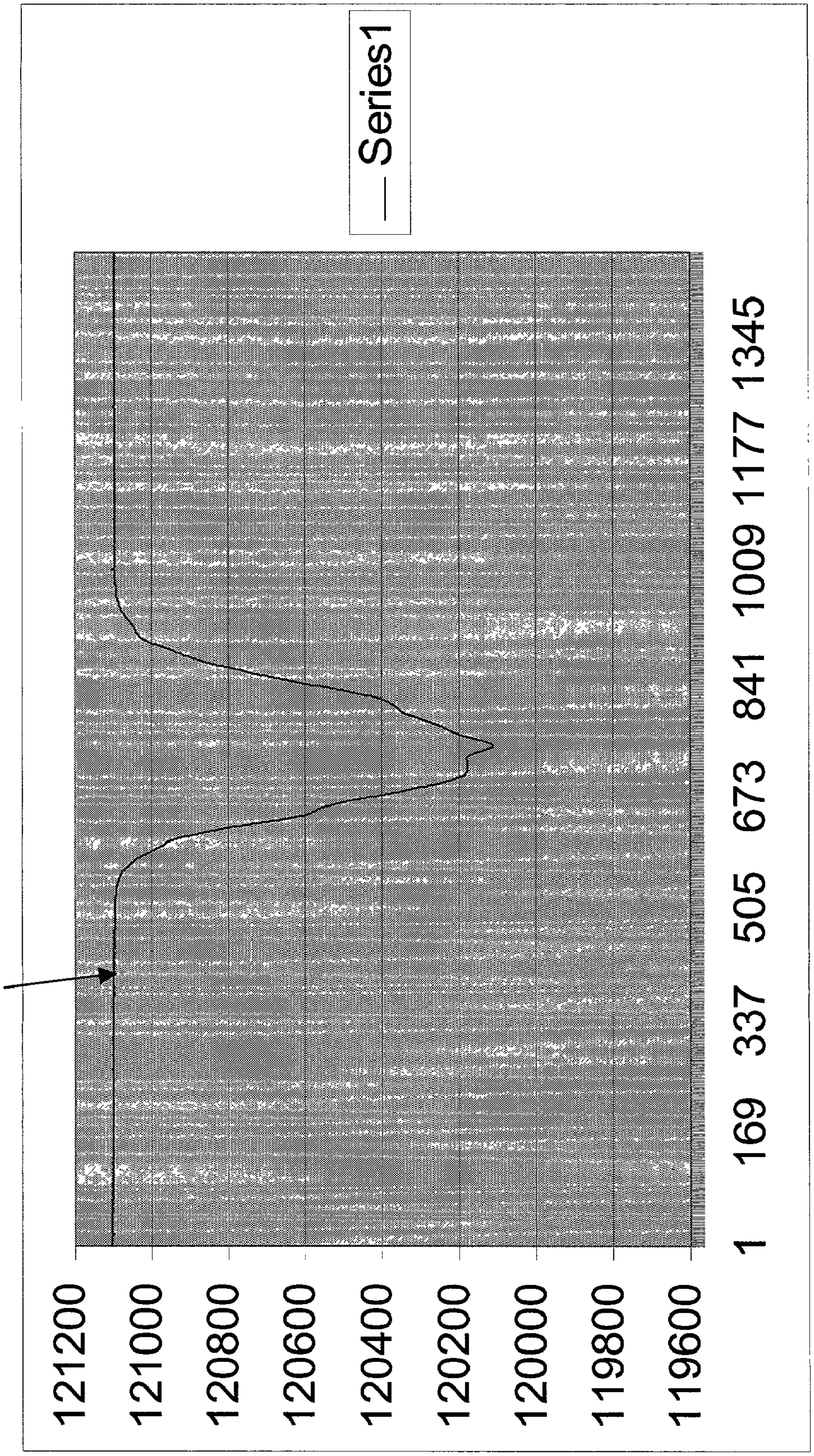
FIG. 9 is an exemplary signature information of a vehicle traveling at a speed of five miles per hour over a six feet by six feet signature loop.

FIG. 9 is an exemplary signature information of a vehicle traveling at a speed of five miles per hour over a six feet by six feet signature loop. Curve 910 shows changes in inductance detected by the signature loop as the vehicle moves over the signature loop.

Figure 10:
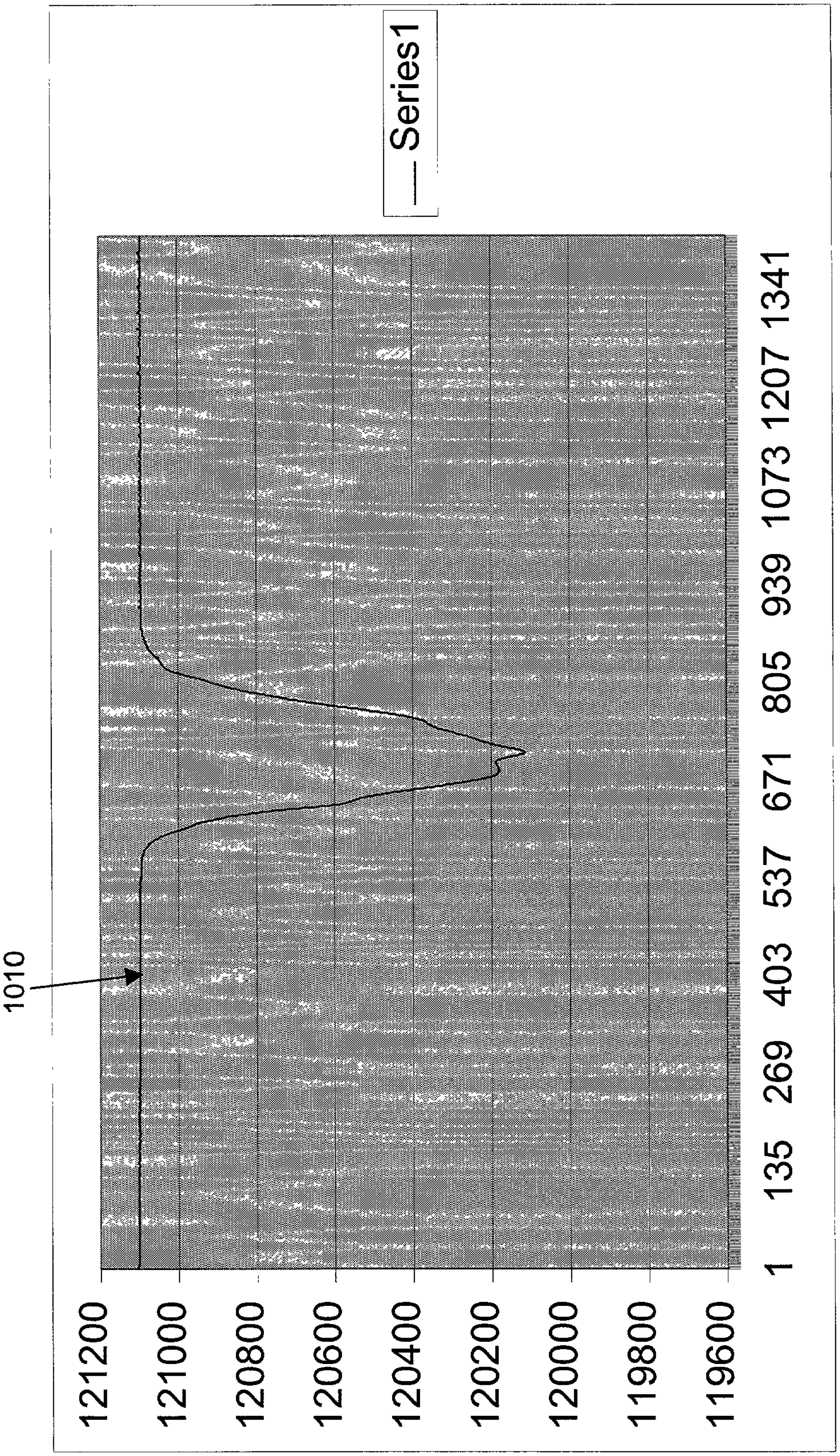
FIG. 10 is another exemplary signature information of a vehicle traveling at a speed of 10 miles per hour over a signature loop.

FIG. 10 is another exemplary signature information of a vehicle traveling at a speed of 10 miles per hour over a signature loop. Curve 1010 shows changes in inductance detected by the signature loop as the vehicle moves over the signature loop.

Figure 11:
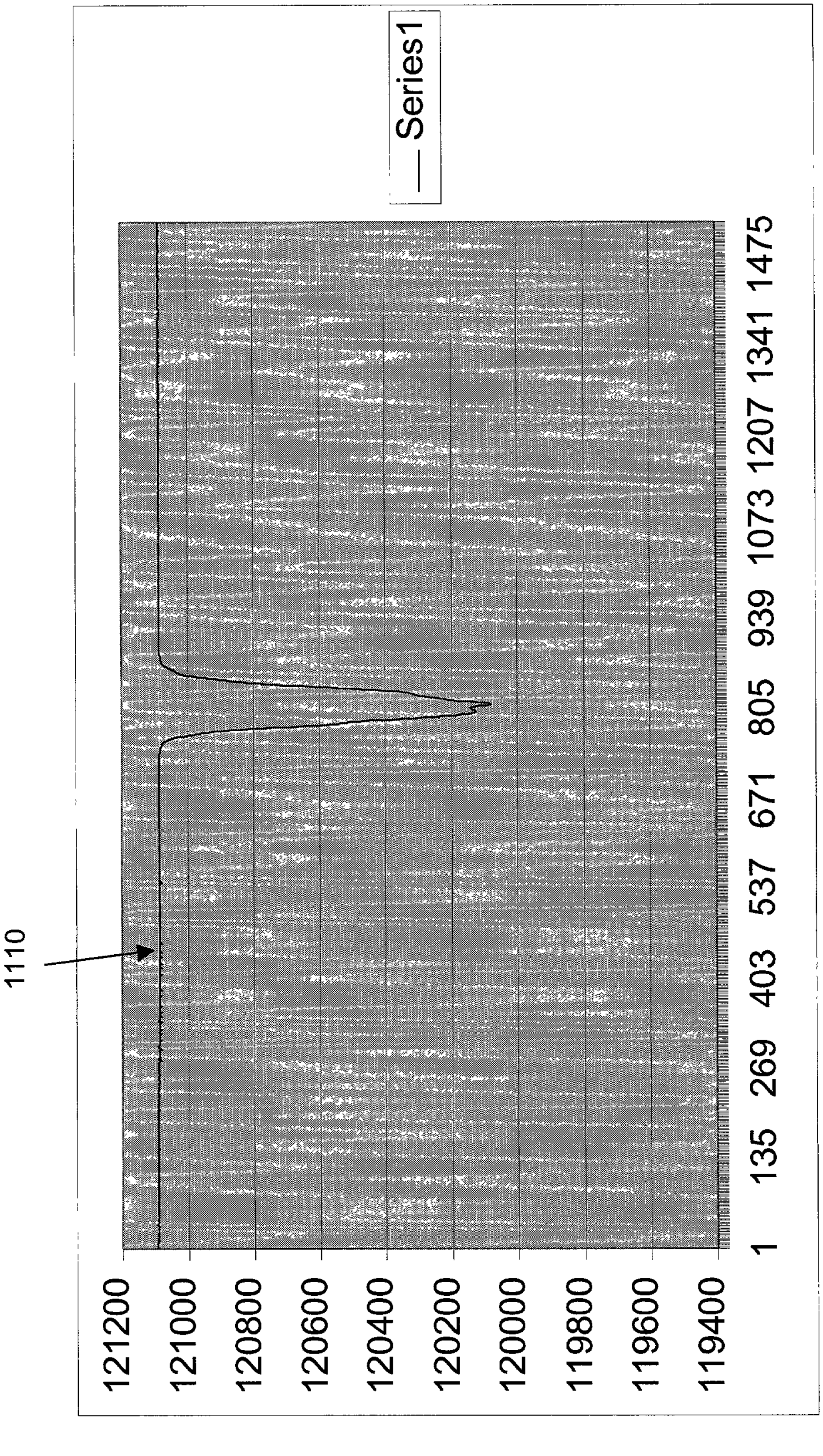
FIG. 11 is an exemplary signature information of a vehicle traveling at a speed of 30 miles per hour over a six feet by six feet signature loop.

FIG. 11 is an exemplary signature information of a vehicle traveling at a speed of 30 miles per hour over a six feet by six feet signature loop. Curve 1110 shows changes in inductance detected by the signature loop as the vehicle moves over the signature loop.

Note that each of curves 910, 1010, and 1110 exhibits a similar pattern. Each of these curves shows that when the vehicle is not detected, the inductance value is in between 121000 units and 121200 units. Each of these curves also shows that when the vehicle is in the center of the signature loop, the inductance value is in between 120000 units and 120200 units. The noticeable difference between these three curves is the width of the gap between two points on the curve when the presence of the vehicle is detected. Indeed, each of these curves characterizes the same vehicle (incidentally, the vehicle is a pickup truck) moving at speeds of five miles per hour, 10 miles per hour, and 30 miles per hour, as represented by curves 910, 1010, and 1110, respectively, over the same signature loop.

Figure 13:
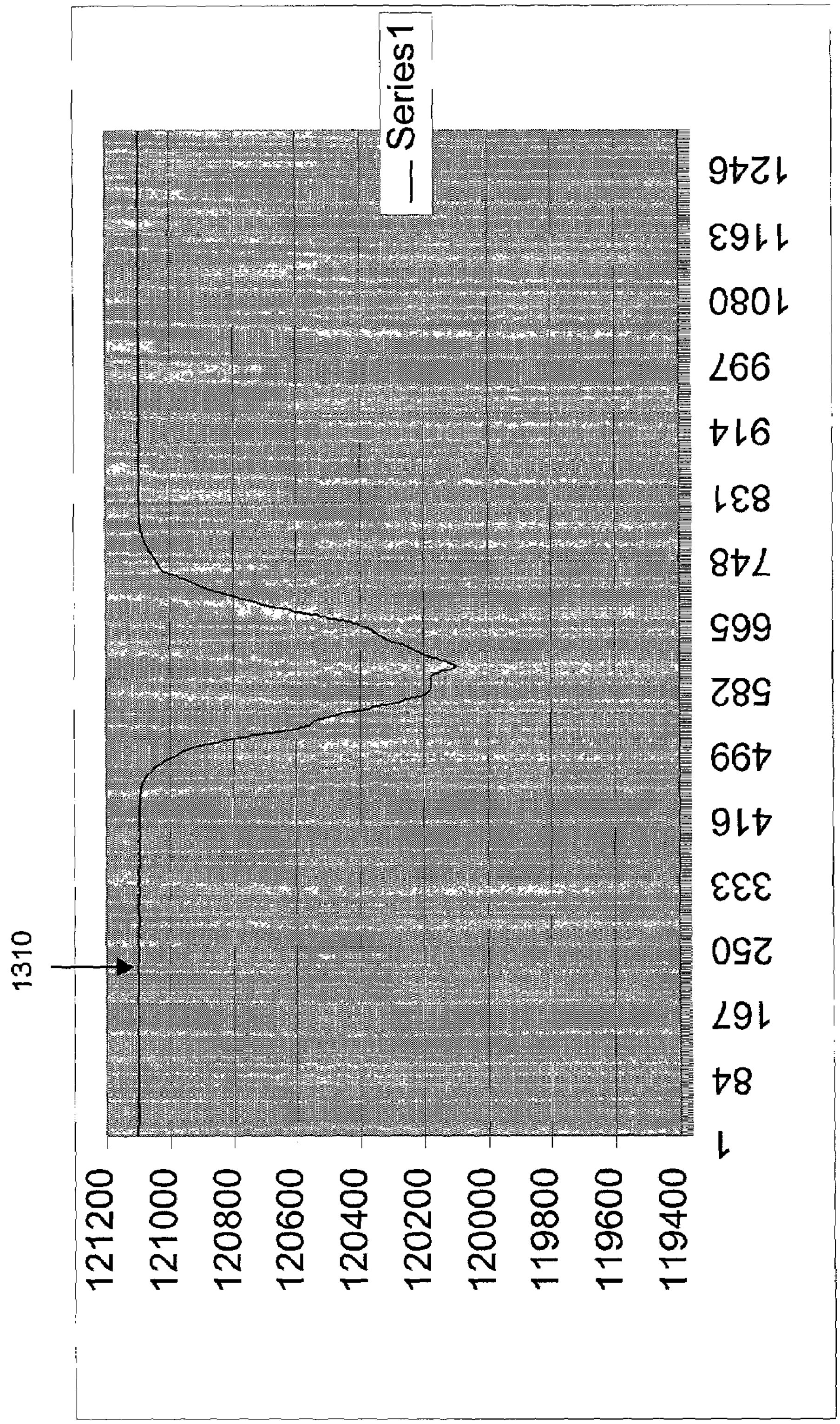
FIG. 13 is an exemplary signature information of a vehicle traveling over an enforcement loop.

FIG. 13 is an exemplary signature information of the same vehicle traveling over an enforcement loop or an intelligent queue loop. Note that curve 1310 exhibits similar pattern of inductance change over time as those characterized by curves 910, 1010, 1110.

FIG. 8 is an exemplary wheel assembly information of a two-axle vehicle traveling over a wheel assembly loop at ten miles per hour. Curve 810 indicates changes in inductance as the vehicle travels over the wheel assembly loop. First peak 812 indicates the detection of a front wheel of the vehicle. Second peak 814 indicates the detection of a rear wheel of the vehicle.

FIG. 12 is an exemplary wheel assembly information of a two-axle vehicle traveling over a wheel assembly loop. Curve 1210 indicates changes in inductance as the vehicle travels over the wheel assembly loop. First peak 1212 indicates the detection of a front wheel of the vehicle. Second peak 1214 indicates the detection of a rear wheel of the vehicle.

FIG. 14 is another exemplary wheel assembly information of a two-axle vehicle traveling over a wheel assembly loop. Curve 1410 indicates changes in inductance as the vehicle travels over the wheel assembly loop. First peak 1412 indicates the detection of a front wheel of the vehicle. Second peak 1414 indicates the detection of a rear wheel of the vehicle.

Figure 21:
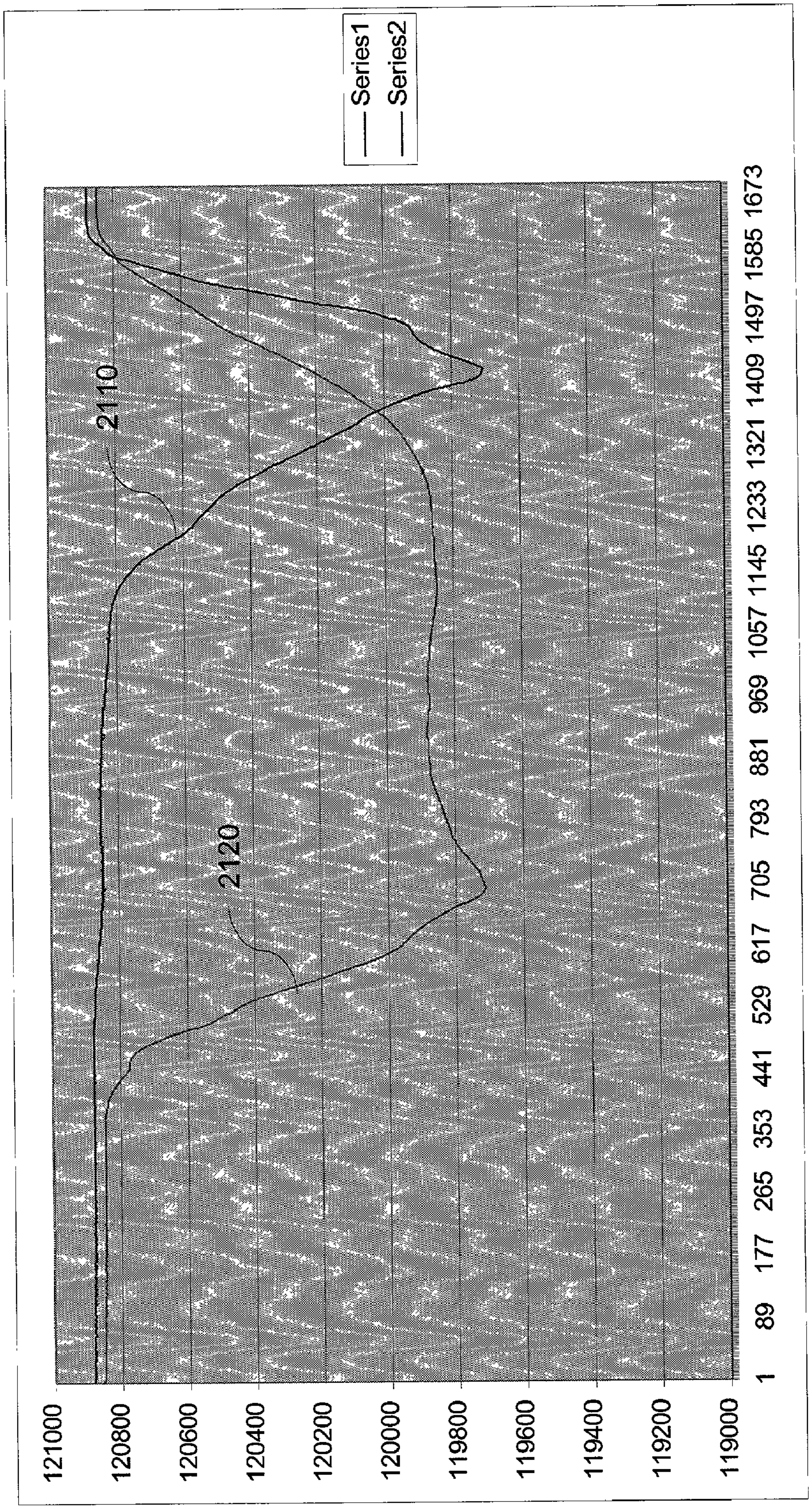
FIG. 21 is an exemplary initial signature information indicating a vehicle traveling at one speed over a signature loop and an exemplary subsequent signature information indicating the same vehicle traveling at another speed over an intelligent queue loop.

Referring now to FIG. 21, initial curve 2110 characterizes a vehicle travelling at a first speed over a signature loop. Subsequent curve 2120 characterizes the vehicle slowing down significantly when it was detected by an intelligent queue loop 240. Both curve 2110 and curve 2120 have identical lowest inductance between 119600 units and 119800 units, indicating that each of curve 2110 and curve 2120 characterizes the same vehicle.

Figure 22:
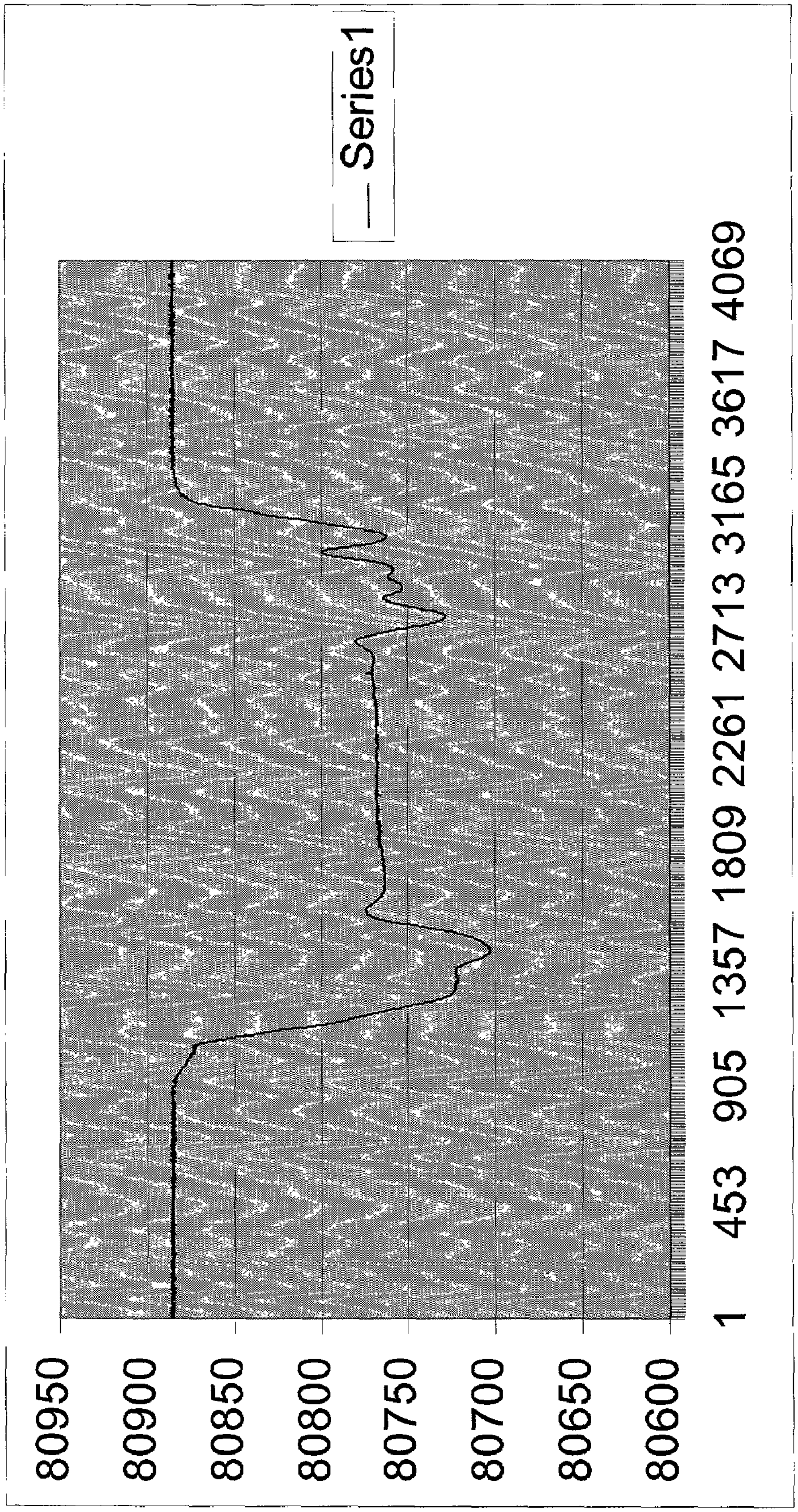
FIG. 22 is an exemplary signature information of a four-axle vehicle.
Figure 23:
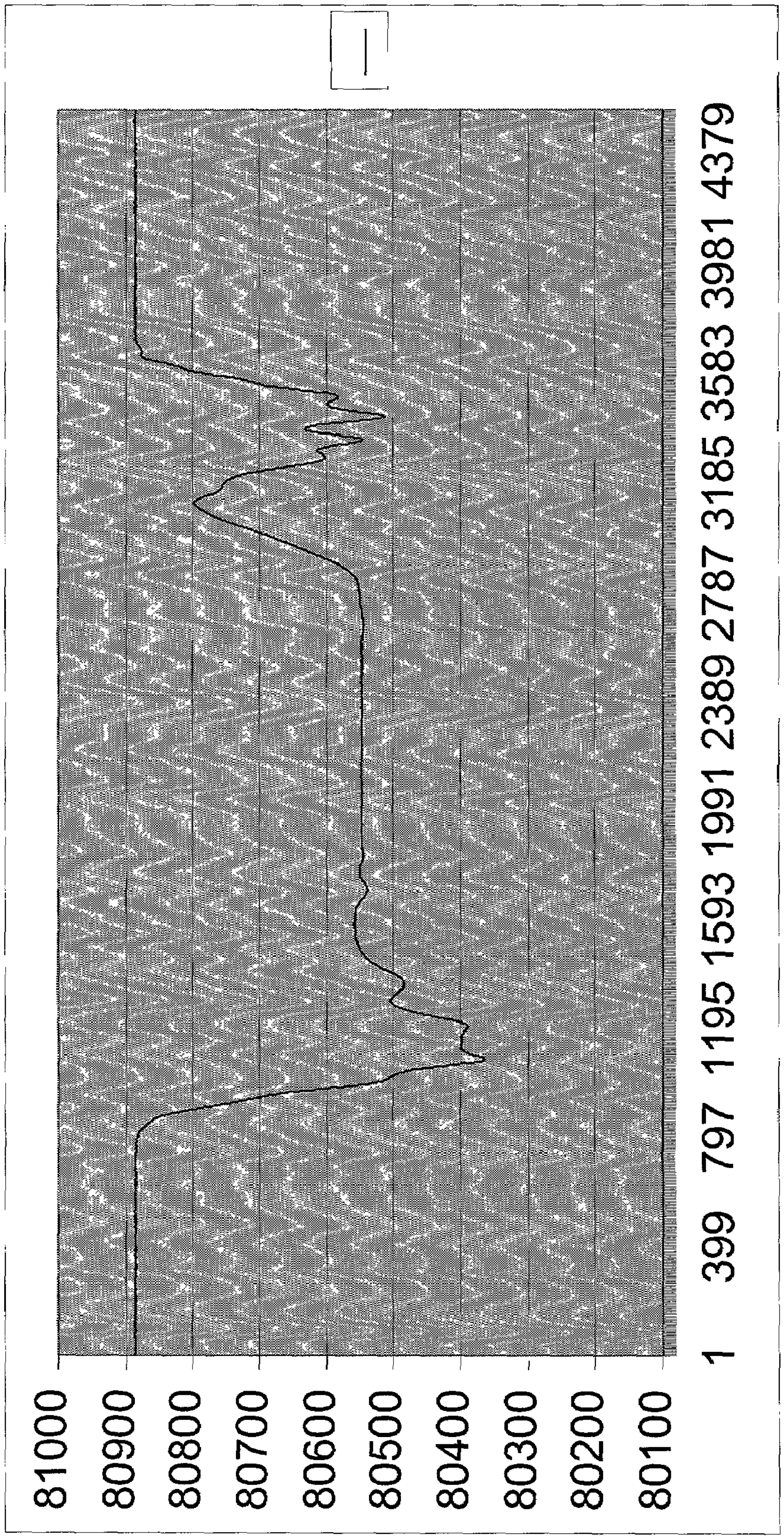
FIG. 23 is an exemplary signature information of a vehicle towing a two-axle trailer.
Figure 24:
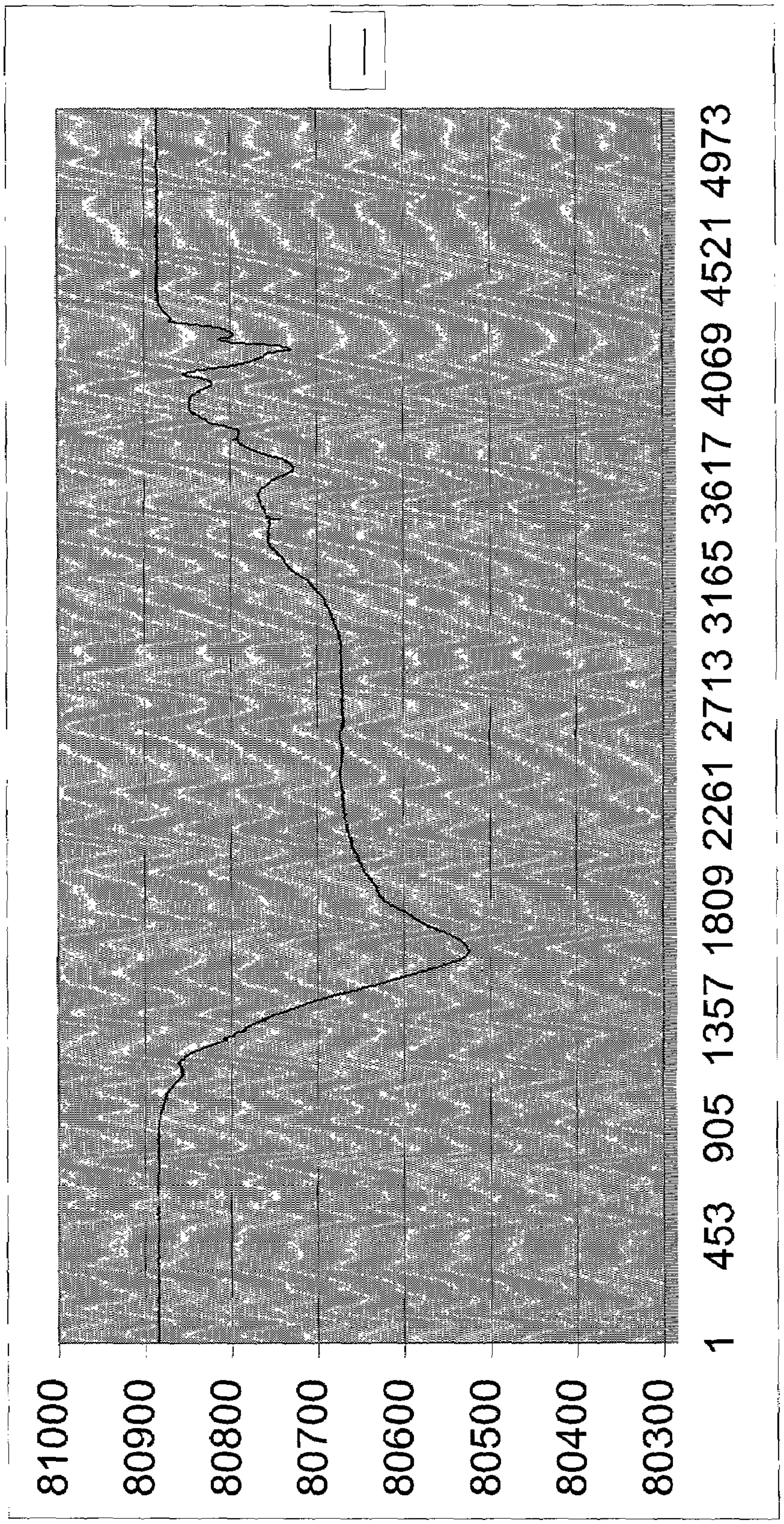
FIG. 24 is an exemplary signature information of a five-axle truck.
Figure 25:
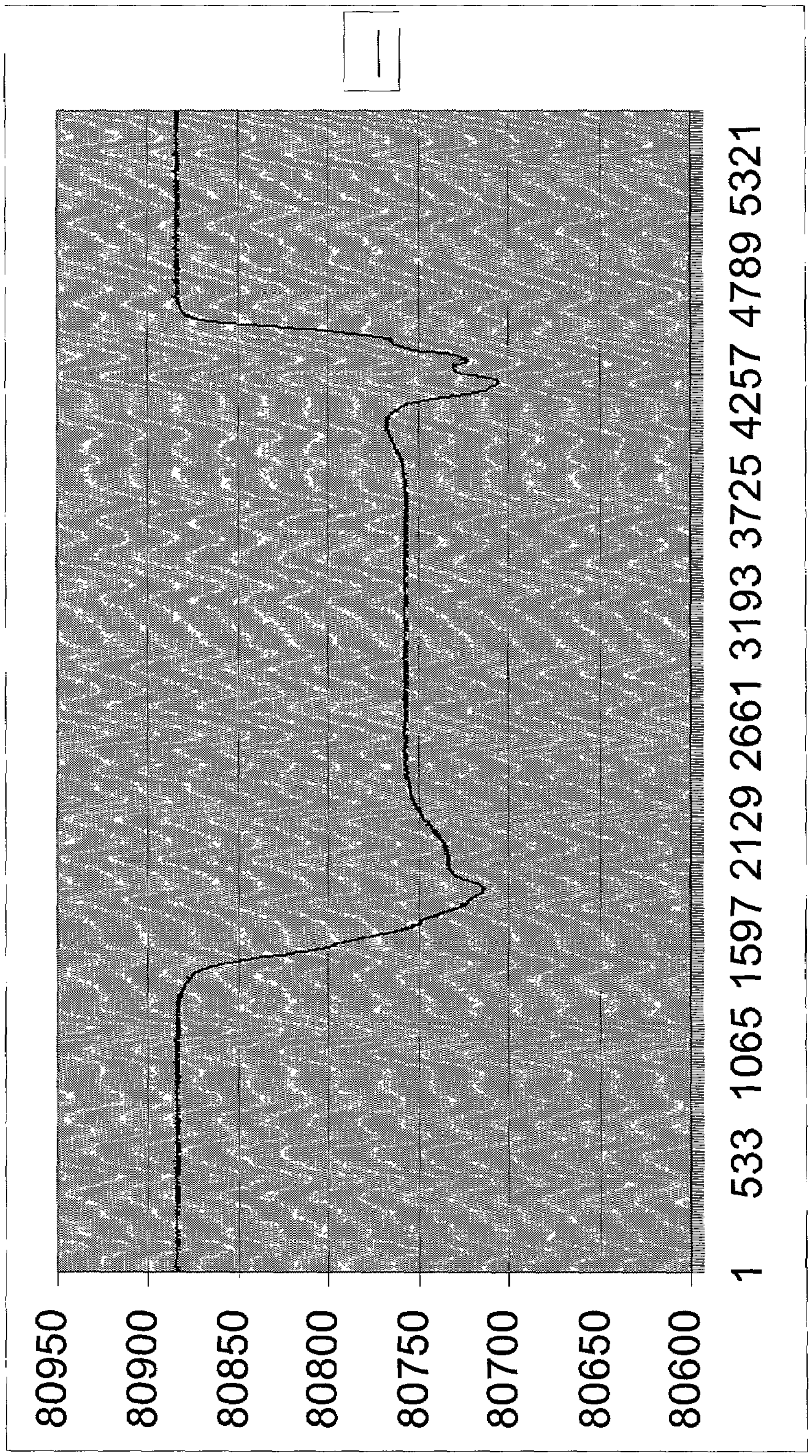
FIG. 25 is an exemplary signature information of a three-axle dump truck as detected by an intelligent queue loop.

FIGS. 22–25 are additional exemplary inductance vs. time plots representing signature information of different categories of vehicles. FIG. 22 is an exemplary signature information of a four-axle vehicle. FIG. 23 is an exemplary signature information of a vehicle towing a two-axle trailer. FIG. 24 is an exemplary signature information of a five-axle truck. FIG. 25 is an exemplary signature information of a three-axle dump truck.

Referring back to FIG. 2, intelligent vehicle identification unit 270 comprises a microprocessor. The microprocessor is preferably capable of gathering data from one or more distinct inductive loop measurement and processing units such as loop detector 260. One example of loop detector 260 is a microprocessor that provides an oscillating circuit. Loop detector 260 can be incorporated into intelligent vehicle identification unit 270. Loop detector 260 receive the profile information from classification loop array 200 and the subsequent signature information from intelligent queue loop 240. Furthermore, intelligent vehicle identification unit 270, given the signals received (which comprises the profile information and the subsequent signature information), can perform various calculations on the signals to determine core information about a vehicle passing over the inductive loops such as relative vehicle mass, vehicle length, average passing speed of the vehicle, direction of movement of the vehicle, number of axles present on the vehicle, and the spacing between subsequent axles on the vehicle.

Intelligent identification unit 270 is in communication with display and local interface 272 and remote access and interface 274. Intelligent identification unit 270 has access to a vehicle library comprising predefined vehicle classifications or categories, and their associated fares. The vehicle library can be modified through a graphical user interface associated with intelligent identification unit 270. Modification of the vehicle library can involve, for example, adding, deleting, and editing of vehicle categories. The modification can be performed through a computer associated with a local area network with which intelligent vehicle identification unit 270 is associated. Preferably, the modification can also be performed through a computer associated with a wide area network with which intelligent vehicle identification unit 270 is associated.

Once the information received from loop detector 260 is processed by intelligent vehicle identification unit 270, the resultant signature data of the vehicle is utilized in a comparison engine. The comparison engine employs both stored typical vehicle signatures for various distinct categories of vehicles and neural network processing to intelligently associate the exact data received with a representative vehicle signature previously defined. Also, the initial signature information is stored for later comparison with the subsequent signature information received from intelligent queue loop 240.

After processing this data against the vehicle library and through the neural network processing, the microprocessor assigns a distinct classification identifier to the vehicle and internally queues the data thus received and awaits a detection signal from intelligent queue loop 240. The vehicle library is preferably stored in a database accessible by intelligent vehicle identification unit 270.

Once the subsequent signature information is received from intelligent queue loop 240 by the microprocessor, the microprocessor performs an analysis on this signature information to see if it properly represents the next internally queued vehicle for purposes of ascertaining that the vehicle arriving at payment point 290 is the same vehicle that the system expects to be arriving at payment point 290. Under one circumstance, a vehicle, e.g., a motorcycle, could potentially pass over classification loop array 200 and then exit toll lane 100 early. In another instance, the vehicle could potentially miss passing over classification loop array 200 and move into toll lane 100 at a later point, thus missing being correctly classified by the system beforehand. Intelligent queue loop 240 is utilized in both circumstances to detect such queuing anomalies.

The microprocessor that is utilized to analyze the various loop signatures can preferably send data to another main processing device to gather data, control traffic flow, or otherwise process the data in a meaningful manner. In a toll collection embodiment of the invention, this collection processing device would be another microprocessor unit designed to assimilate various input data and toll collection device control to assist in collecting proper fare amounts for vehicles passing through the toll lane.

If a vehicle crosses intelligent queue loop 240 and is not recognized as the next classified vehicle, the microprocessor will check any other queued classified vehicles to see if the signature matches any other vehicles thus queued. If the subsequent signature information matches a later vehicle, then the microprocessor will assume that any earlier queued vehicles have exited the lane after crossing classification loop array 200 and will discard those vehicles from the queue.

If a vehicle crosses intelligent queue loop 240 and is not recognized as the next classified vehicle or as any of the vehicles subsequent in the vehicle classification queue, the microprocessor will then make the assumption that the vehicle entered toll lane 100 late and that it was not properly classified. A new vehicle classification record will then be inserted into the queue at that point and marked such that the system does not reliably know what type of vehicle is currently at the head of the queue.

If a vehicle entered toll lane 100 late, thus causing an anomaly in the proper queuing of vehicles, an appropriate message will be sent from the microprocessor to the main processing device so that the main processing device can make an appropriate decision based on the type of anomaly that occurred in queuing and present the toll attendant with the appropriate information for making an informed decision on how to handle the errant vehicle, if the toll lane is a manual collection lane. The collection-processing device must make a decision on the expected toll based on rules established by the authority (default fare) if the main processing device is utilized to automatically operate a toll collection lane without the use of a toll attendant.

Other than the previously specified anomaly situation in queuing, the microprocessor will normally pass information regarding the next queued vehicle to the toll collection processing device. The processing device receives this classification identifier from the inductive loop control microprocessor and cross-references the classification identifier against a cross-reference database of identifiers and toll classifications as defined by the tolling authority. This cross-reference action is used to assign a particular authority classification and, thus, an appropriate fare amount expected for the vehicle.

Since many vehicles with distinct classification identifiers are of the same general type as it pertains to the local tolling authority's fare structure, this cross-reference action serves to reduce the number of distinct vehicle classifications to just those distinct classifications and associated fare amounts as defined by the tolling authority. For example, a particular tolling authority might assign the same general classification to a motorcycle and a passenger car even though these two vehicles would generate two distinct classification identifiers or profile information.

Once the collection processing device has received and cross-referenced the vehicle data internally, it will communicate the appropriate classification and fare expected for the vehicle to the toll attendant if the lane is operating in a manual operational mode. If the toll lane is operating in an automatic mode, the data will be used to communicate to any attached automatic toll collection equipment the expected fare amount that the vehicle operator must present to gain passage through toll lane 100.

In order to provide the cross-reference database utilized in the toll collection processing device, a user program is provided with the corresponding toll management system. This program allows the toll authority to select each vehicle type that is distinctly identified by the loop system microprocessor program and match it with one of the predefined or predetermined classifications set up by the authority, which subsequently defines the amount of the fare expected for that vehicle type.

The user program can preferably be adapted to employ the use of digital photographs for each type of vehicle to further illustrate the exact type of vehicle (or vehicles) which would fall under each category of vehicles classified by the loop system microprocessor for visual reference. The authority personnel would then create the cross-reference table by matching up each loop microprocessor classification with the corresponding authority classification. FIGS. 17–20 are exemplary screenshots of such information.

Additionally, for vehicles with too many axles to be classified by the authority's base classification system, the cross-reference table also allows the user to define the additional number of axles to add to the base classification axle count to determine the total fare for such vehicles.

As the user completes the cross-reference process utilizing the user program for such purposes, the data is saved to the plaza system database and subsequently distributed to each toll lane processing computer for subsequent use in cross-referencing subsequent vehicles for automatic classification purposes.

Preferably, intelligent identification unit 270 includes management software tools. The software tools enable every transaction (e.g., each vehicle's passing through the toll lane) to have a complete audit trail. Tracking each transaction increases the accuracy of the revenue collection process.

The system shown in FIG. 2 further comprises payment point 290, which is preferably located upstream of toll gate 252, but downstream of classification loop array 210 in direction 130. Payment point 290 may be equipped with an automated toll collection mechanism. Alternatively, payment point 290 may be staffed with a toll attendant. When an appropriate fare is received at payment point 290, toll gate 252 opens to allow the vehicle to continue to move in direction 130. It is noted that other traffic control apparatus may be used in lieu of toll gate 252. For example, traffic lights may be used.

As disclosed above, the capability to charge different toll fees for different vehicle types at payment point 290 without a toll attendant is possible with the present invention.

For convenience, a system of the present invention as shown in FIG. 2 may be hereinafter referred to as an intelligent vehicle identification system (IVIS). The IVIS of the present invention can have a number of embodiments including but not limited to those shown in FIGS. 2–5.

The IVIS, as implemented in FIGS. 2–5, combines hardware and software to identify or classify a vehicle using an arrangement of inductive loops. The shapes, layout, and number and type of loops in each of the arrangements can vary depending on how the toll lane is to be used. For example, different layouts and designs may be required for slow speed and high speed toll lanes.

Figure 3:
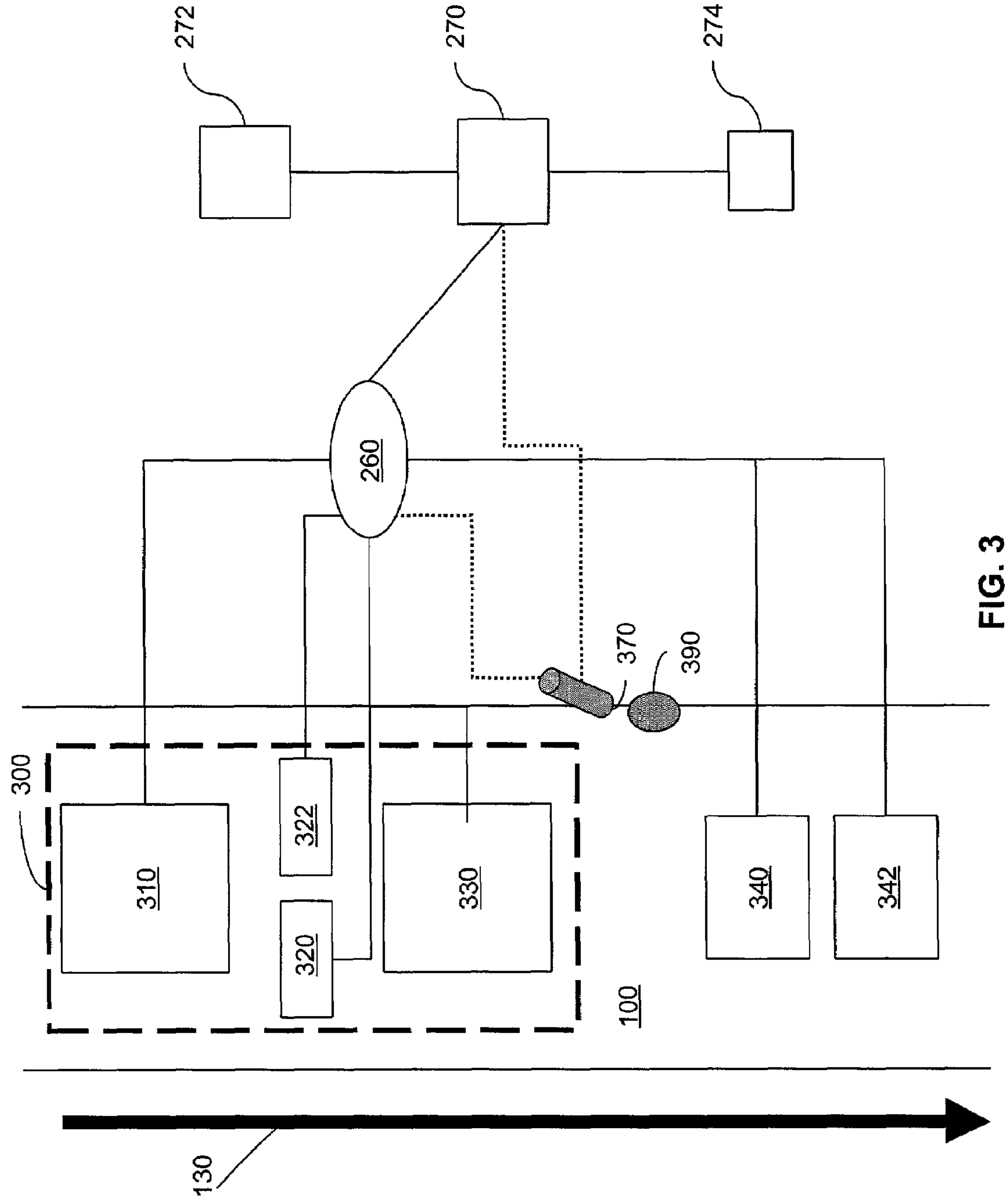
FIG. 3 is a schematic diagram illustrating another embodiment of the present invention as implemented in a toll road application.

In FIG. 3, for example, classification loop array 300 is adapted to indicate changes in electromagnetic field which can be processed to produce profile information of a vehicle that travels over it in direction 130. The profile information includes initial signature information, which is produced based at least in part on data collected by front signature loop 310 and rear signature loop 330, as well as wheel assembly information which is produced based at least in part on data collected by left wheel assembly loop 320 and right wheel assembly loop 322. One or more of an axle count, axle spacing, speed, and height of axles from the surface of the toll lane can be determined using the profile information. The data collected by the loops is provided to loop detector 260 for processing. Furthermore, loops 340 and 342 can also be adapted to indicate changes in electromagnetic field which can be processed to produce subsequent signature information at locations downstream of payment point 390.

Each of the wheel assembly loops 320 and 322 is designed to detect primarily tires and wheel assemblies of a vehicle. The small concentrated field width of each of the wheel assembly loops 320 and 322 is obtained by controlling the spacing between the wire turns. Preferably, the spacing ranges between four and seven inches. The wheel assembly loops are designed in accordance with the range of ground clearance present in the vehicle population. Preferably, the single wire that is used to form each wheel assembly loop is looped at least twice, thus creating two overlapping layers of wire for each wheel assembly loop.

Design of wheel assembly loops 320 and 322 depends on a number of factors. The factors include characteristics of vehicles anticipated for the toll lane at which the loop is to be installed. The characteristics include number of axles, distance between axles, speed of vehicle through the toll lane, height of chassis from top of roadway, and other attributes of vehicles detectable by inductive loops.

Vehicle separation loops 340 and 342 are designed to be used to gain additional information on the target vehicle. For example, vehicle separator loops 340 and 342 can determine the beginning and end of a vehicle by analyzing the percent in change of inductance. Also, the magnitude of the percent change in inductance is proportional to the chassis size and distance from the vehicle separation loops 340 and 342. In addition, vehicle separation loops 340 and 342 can be used to, as it's name suggests, "separate" each vehicle one from another.

The use of vehicle separation loops 340 and 342 provides vehicle presence, vehicle speed, and chassis length information. A special signal discriminator is preferably provided with the two processed signals received from vehicle separation loops 340 and 342. Preferably, the signal discriminator processes this information and compares the vehicle speed, chassis length, axles, and chassis height information being collected from vehicle separation loops 340 and 342. The signal discriminator considers several factors during this process. For example, the percent in the change of inductance is used to sense the beginning of a vehicle and the end of a vehicle. Also, the magnitude of the percent change in inductance is proportional to the bottom chassis height and distance from each of the loops. For example, a motorcycle being followed closely by a car or truck would have a significant difference in the percent of inductance change. The movements or speed of the vehicle is also measured on each of these loops. The movements or speed of the vehicle is determined as a function of percent change of inductance over time. The function of these two factors is used to calculate the speed of the vehicle. When the vehicle is not moving or static the percent change in inductance becomes constant.

These constant values for the percent change of inductance appear as flat horizontal lines when displayed on an inductance vs. time plot in which the Y-axis represents the percent change in inductance and the X-axis represents time. A single vehicle or a vehicle towing another vehicle will normally maintain the same speed. When two vehicles are following each other in close proximity, the vehicles typically have somewhat different speeds or start and stop independently of each other. The signal discriminator measures these differences to separate the vehicles. Also the length of the vehicle chassis is calculated to determine if it is a single vehicle.

Again, this processor is unique since it performs this function independently, provides outputs and transfers the information within the IVIS. This information can be used to provide volume counts. This process can be used in tolling or other applications to replace light curtains, optical scanners, video detectors, and microwave detectors.

A single vehicle or a vehicle towing another vehicle will normally maintain the same speed. When two vehicles are following each other in close proximity, the vehicles typically have different speeds. Vehicle separation loops 340 and 342 measure these differences to separate the vehicles. Also, the length of the vehicle chassis is calculated to verify the existence of one or multiple vehicles. Accordingly, vehicle separation loops 340 and 342 can be used in the tolling application to replace light curtains, optical scanners, video detection, and microwave detectors that are currently in use.

The loop signal processor and discriminator (LSP&D) unit preferably has two or more channels of detection that compares the information processed on a continuous basis to determine when a vehicle ends and when a new vehicle starts. The end of the vehicle is used to end the collection of the transaction information. The LSP&D has the ability to determine the beginning of a vehicle, the end of a vehicle and distinguish when two vehicles are traveling in close proximity to each other and/or a vehicle is towing another vehicle. The LSP&D processes information from two loops and compares the information to determine if the information represents a single vehicle or multiple vehicles. When the end of the vehicle is determined the processor can set a timer based on the speed of the vehicle.

In a different arrangement in which loop 342 is an enforcement loop, as the timer completes its countdown, violation enforcement camera 370, which is in communication with enforcement loop 342, receives the signal output to take a picture.

Enforcement loop 342 is designed to work with camera 370 as part of a violation enforcement system. If a vehicle leaves separation loop 340 before the fare is collected at payment point 390, camera 370 takes a photograph of the vehicle when the vehicle triggers enforcement loop 342. Preferably, camera 370, enforcement loop 342, vehicle separation loop 340, and payment point 390 are located such that the photograph would clearly show the license plate of the vehicle.

Intelligent vehicle identification unit 270 in one embodiment of the present invention may be an assembly of electronic equipment and software that can control other equipment, store vehicle information, and distribute vehicle information to other devices or remote locations using an integrated remote access. Intelligent vehicle identification unit 270 can be adapted to assemble collected data from classification loop array 300 and one or more of vehicle separation loops 340 and 342 to create a composite signature information for the vehicle. One exemplary composite signature is shown in FIG. 21.

This collective body of profile information can include tire information, axle count, axle spacing, chassis height, chassis length, and vehicle speed. The vehicle record is associated with a vehicle type or combination vehicle type (i.e., motorcycle, car, car with trailer) from a database or vehicle library of available signatures. The database is accessible to intelligent vehicle identification unit 270. The vehicle type is then placed into a toll category, defined by the toll authority, to generate the proper fare for the vehicle. This is then used to drive the toll system, prompting the toll attendant when using a manual embodiment, or notifying the driver of the vehicle when using an automated embodiment, of the proper fare which is due.

Again, the vehicle types and categories are definable by the toll authority. Each vehicle type is placed in a category using the graphical user interface associated with intelligent vehicle identification unit 270. The graphical interface includes a library of vehicle types or vehicle combinations using captured digital images of the local vehicle population. The user interface may be a local interface, e.g., local interface 272. The user interface may also be a remote interface, e.g., remote interface 274. The visual interface allows the assignment of the magnetic and/or inductive composites of the vehicle records into different categories by selecting from a menu of captured images. The graphical user interface is a display of digital images of different vehicle categories that are used to represent groups of vehicle types. A group of these categories make up a vehicle library. New vehicle types can be added to the intelligent vehicle identification unit by incorporating the captured image and vehicle signature into the vehicle library. Exemplary screenshots of the vehicle library are shown as FIGS. 17–20.

An intelligent vehicle queuing system of the present invention can be used to insure proper matching of designated toll amounts to each vehicle. The queuing system profiles the approaching vehicle at payment point 390 and compares the data with the profile information held in queue by intelligent vehicle identification unit 270. If the profile is found to be an incorrect match, intelligent vehicle identification unit 270 attempts to properly match the indicated profile with other vehicles waiting in queue, thus insuring that the profiled vehicle is properly associated with the system's indicated amount of fare.

Figure 4:
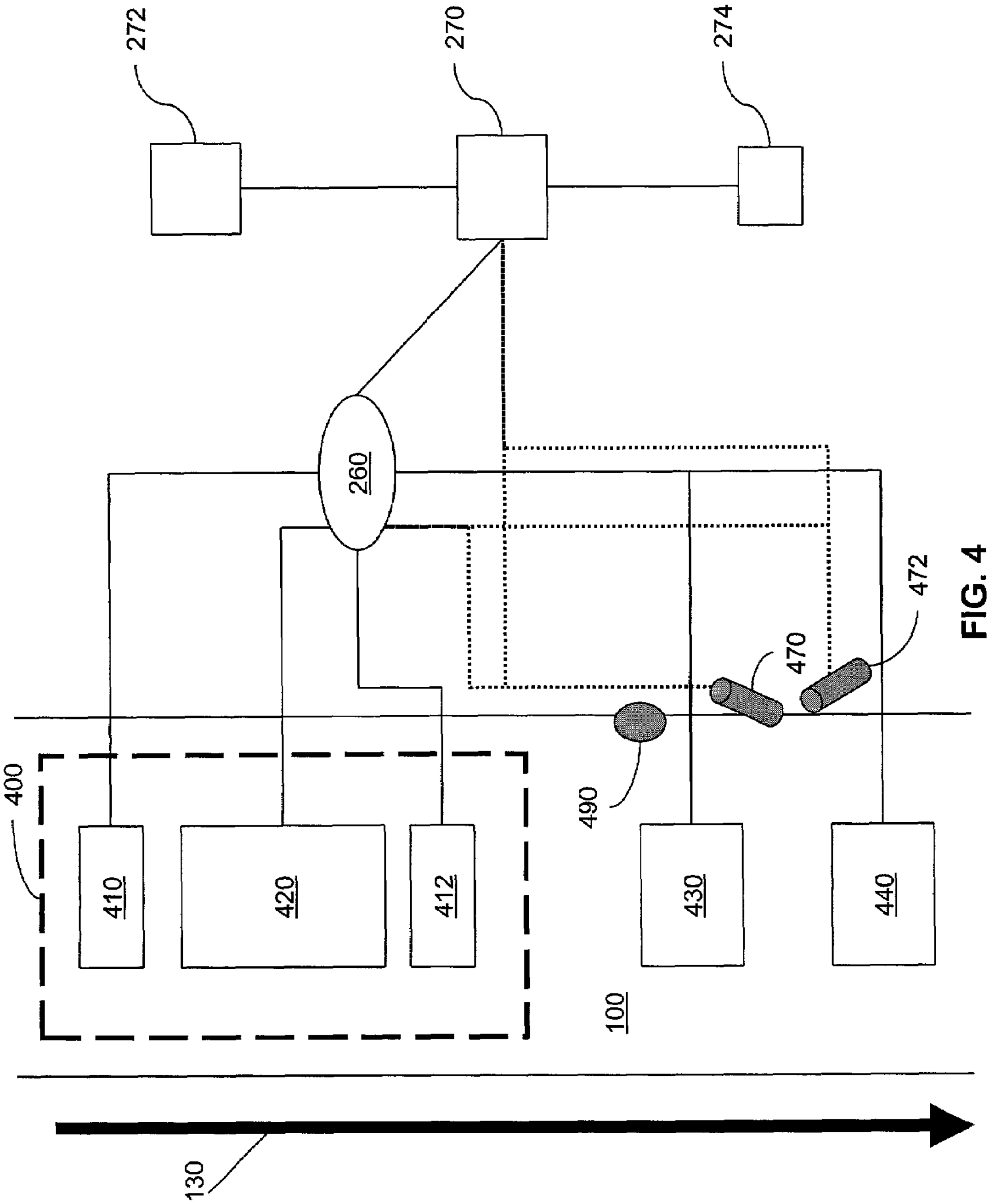
FIG. 4 is a schematic diagram illustrating another embodiment of the present invention as implemented in a toll road application.

FIG. 4 is a schematic diagram illustrating another embodiment of the present invention as implemented in a toll road application. In this embodiment, classification loop array 400 comprises front wheel assembly loop 410, signature loop 420, and rear wheel assembly loop 412. Furthermore, the embodiment shown in FIG. 4 comprises intelligent queue loop 430 and enforcement loop 440, payment point 490, rear view camera 470, and front view camera 472. These components are laid out such that rear view camera 470 and front view camera 472 can capture a photograph for vehicle violation enforcement purposes.

Figure 5:
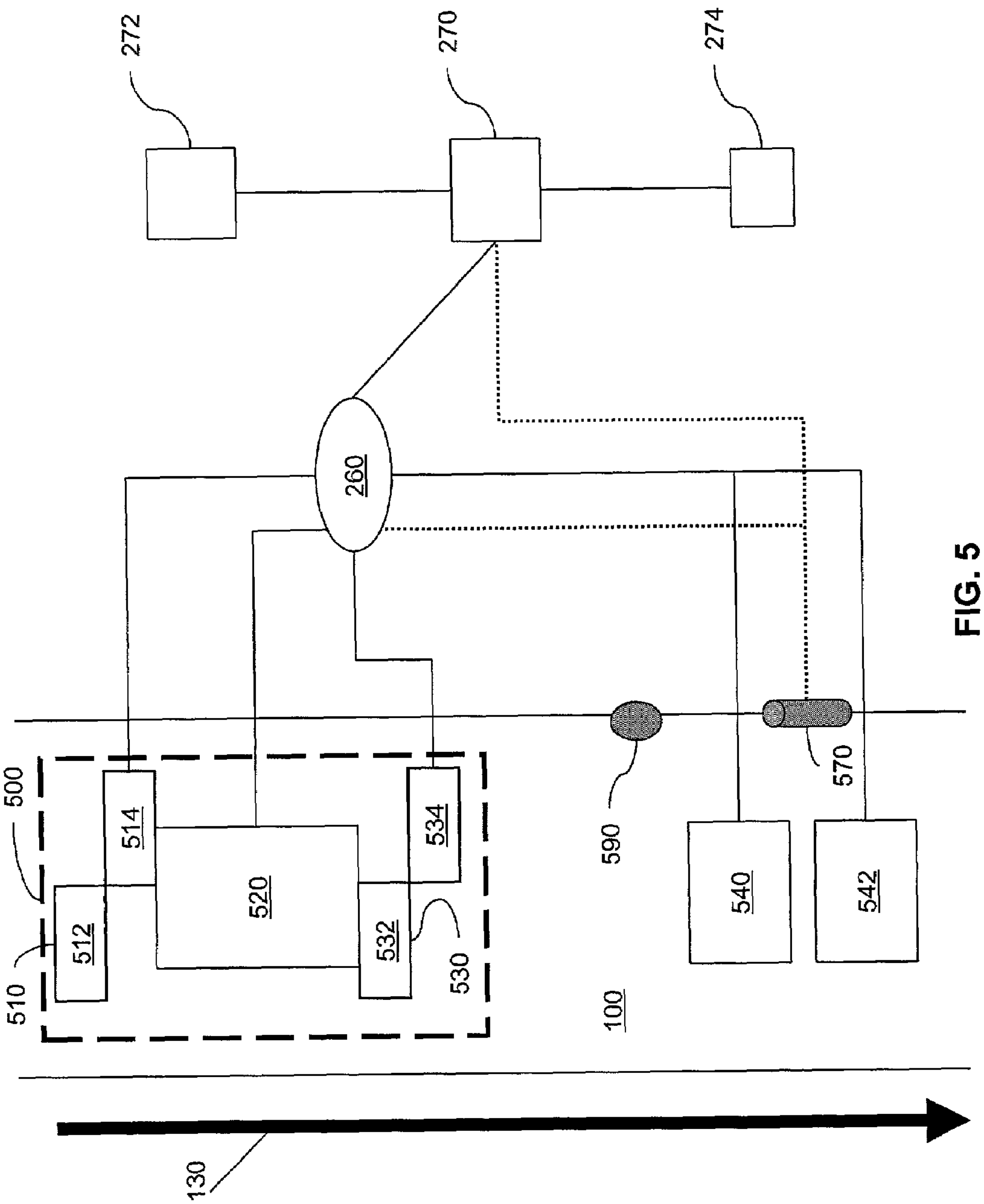
FIG. 5 is a schematic diagram illustrating another embodiment of the present invention as implemented in a toll road application.

FIG. 5 is a schematic diagram illustrating another embodiment of the present invention as implemented in a toll road application. In this embodiment, classification loop array 500 comprises one or more bi-symmetrical offset wheel assembly loops 510 and 530. Each of the bi-symmetrical offset wheel assembly loops 510 and 530 has a left member and a right member. For example, front bi-symmetrical offset wheel assembly loop 510 includes left member 512 and right member 514. Similarly, rear bi-symmetrical offset 530 comprises left member 532 and right member 534. Each of the bi-symmetrical offset wheel assembly loops 510 and 530 preferably has a leading edge offset and a trailing edge offset.

The offset of the left member and the right member of each of these bi-symmetrical offset wheel assembly loops is designed to capture left wheel information and right wheel information at two different instances in time. A more accurate average speed, axle separation, and other axle information can be calculated based on data collected by these bi-symmetrical offset wheel assembly loops 510 and 530.

As indicated in FIG. 5, classification loop array 500 can work with additional loops 540 and 542. As used in different arrangements, one or both additional loops 540 and 542 may be an intelligent queue loop, a vehicle separation loop, an enforcement loop, and a gate loop.

One or more of additional loops 540 and 542 can be adapted to work with camera 570 and payment point 590. A photograph of a vehicle can be captured for violation enforcement purposes if an appropriate fare is not received at payment point 590 when the vehicle is detected by additional loops 540 and 542.

Figure 15:
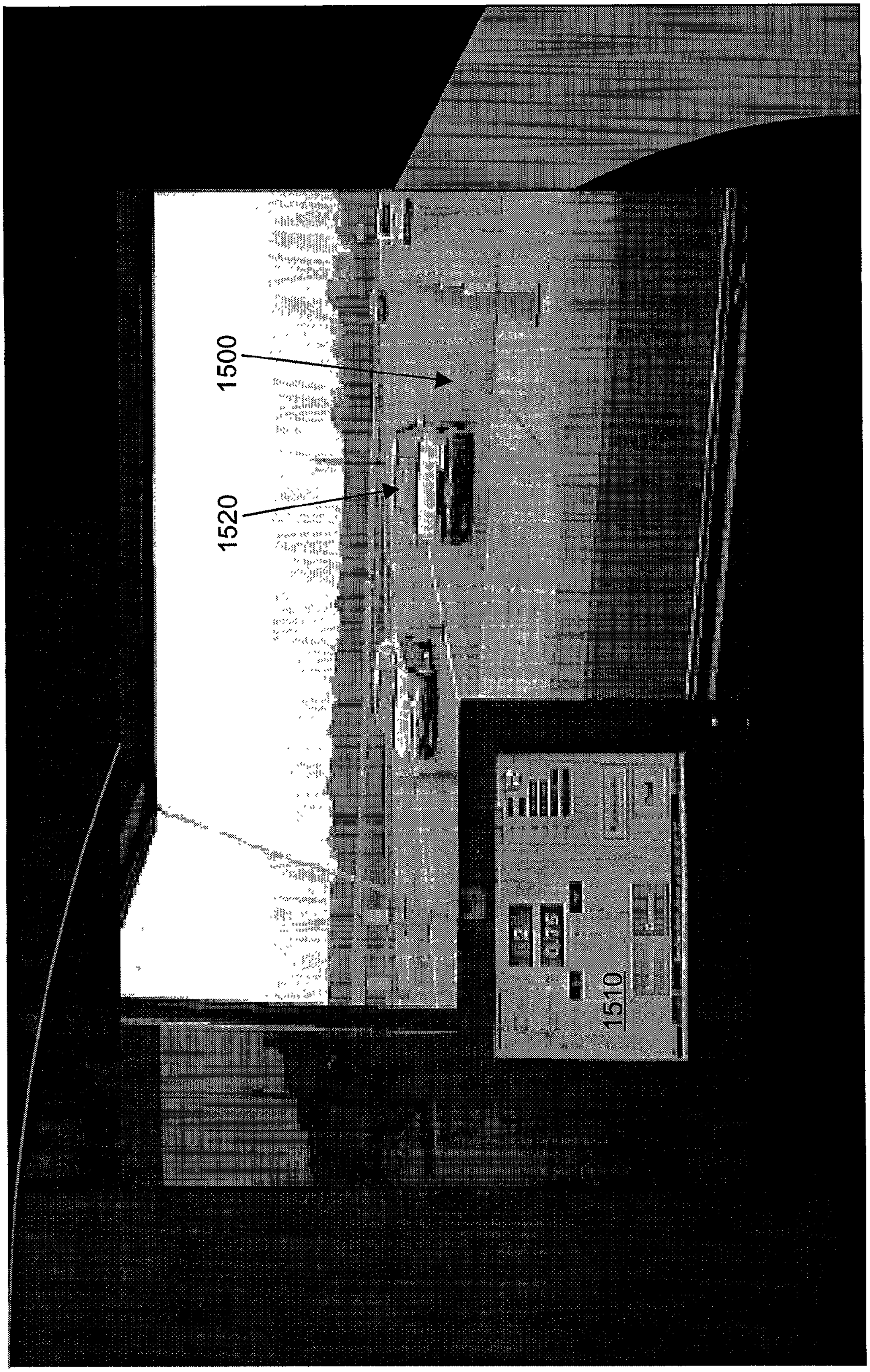
FIG. 15 is a diagram showing a view from a toll collection station indicating that as a vehicle approaches the toll collection station, the vehicle is classified and a fare is determined without input from a toll attendant.

FIG. 15 is a diagram showing a view from a payment point indicating that as vehicle 1520 approaches the payment point that is associated with toll lane 1500, vehicle 1520 is classified and a fare is determined and shown on display 1510 without input from a toll attendant.

Figure 16:
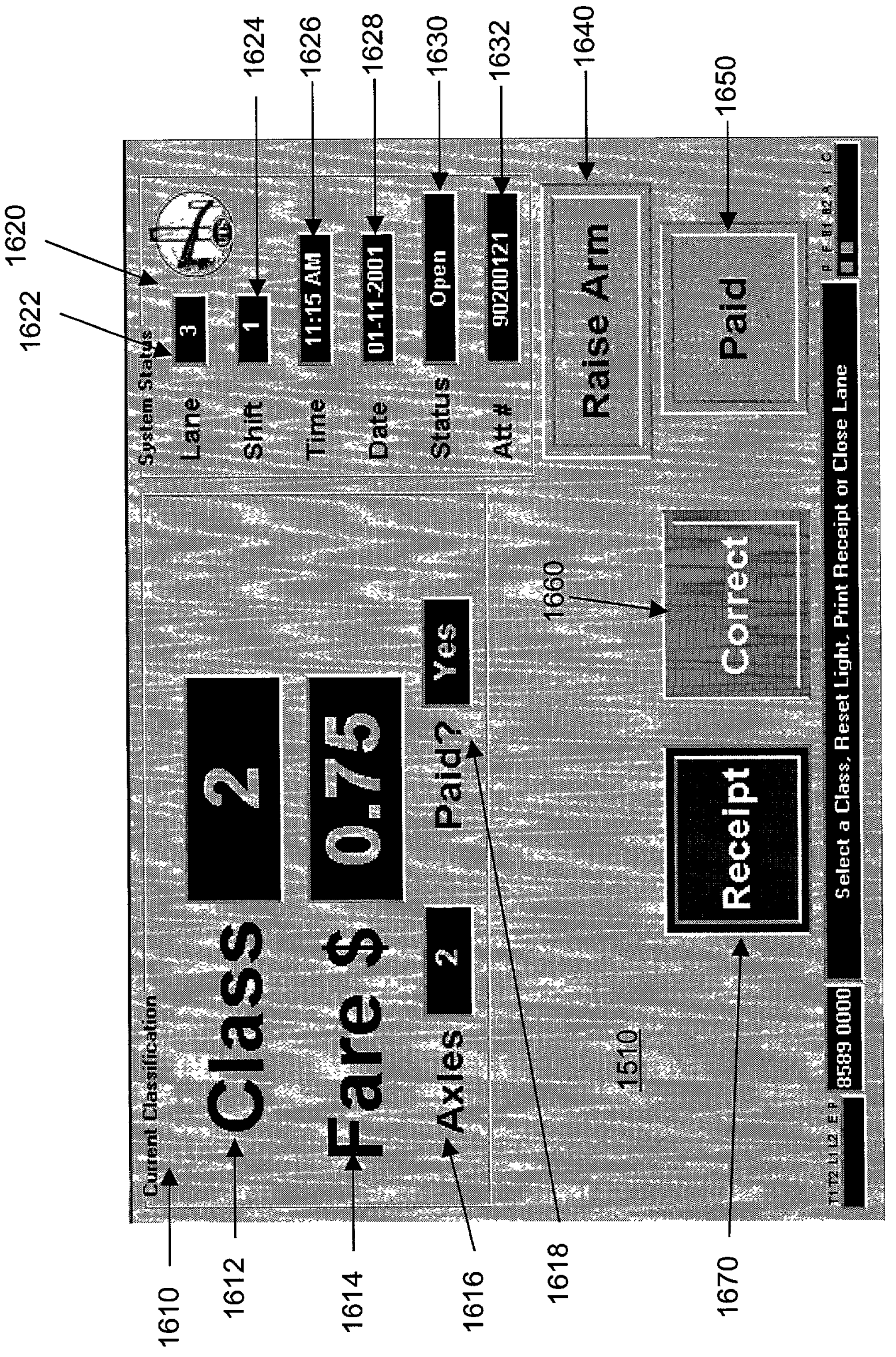
FIG. 16 is a screenshot indicating the classification for the vehicle shown in FIG. 15 and a fare associated with the classification.
Figure 17:
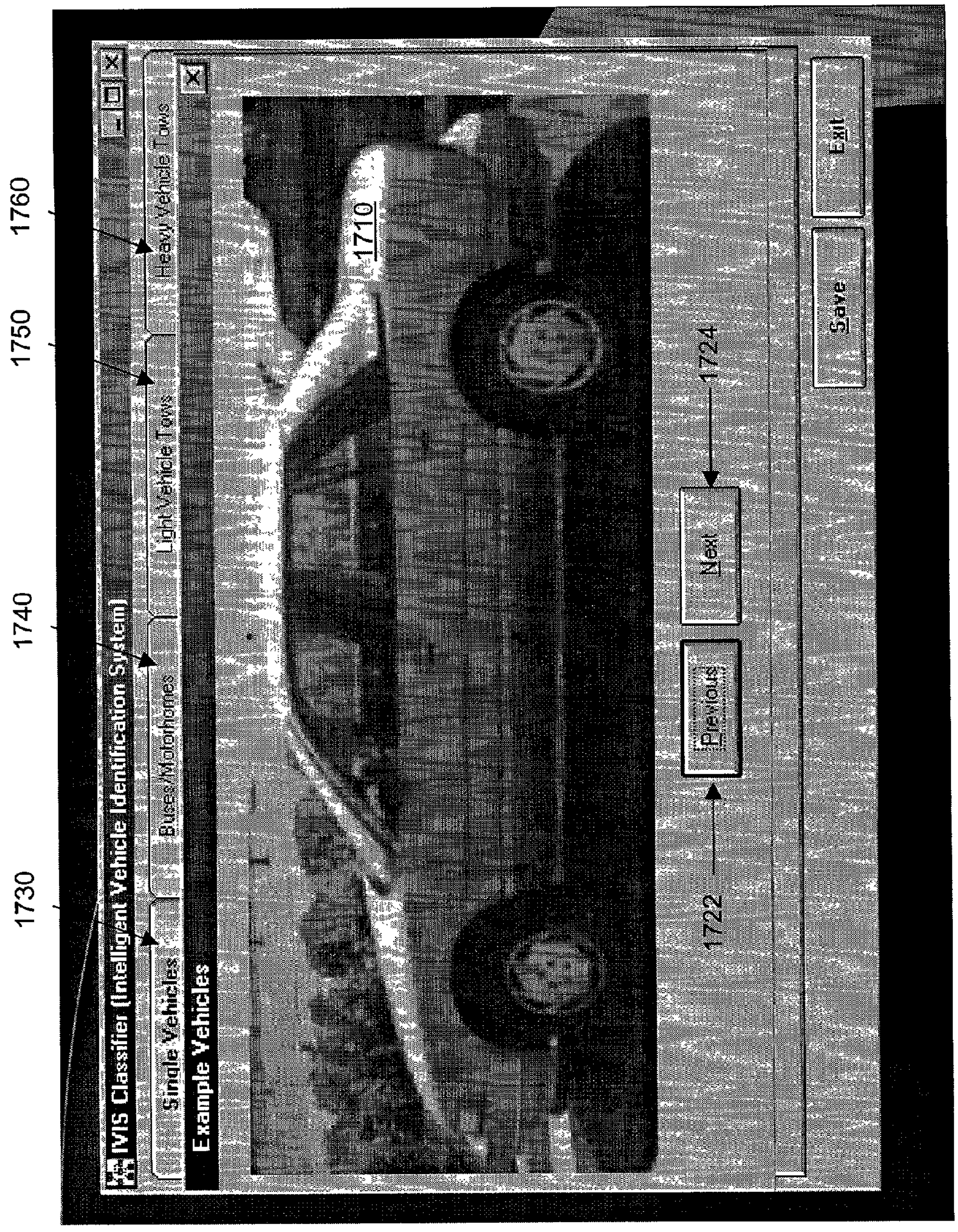
FIG. 17 is a screenshot showing an image of a vehicle category retrievable from a vehicle library that is accessible to an intelligent vehicle identification unit.
Figure 18:
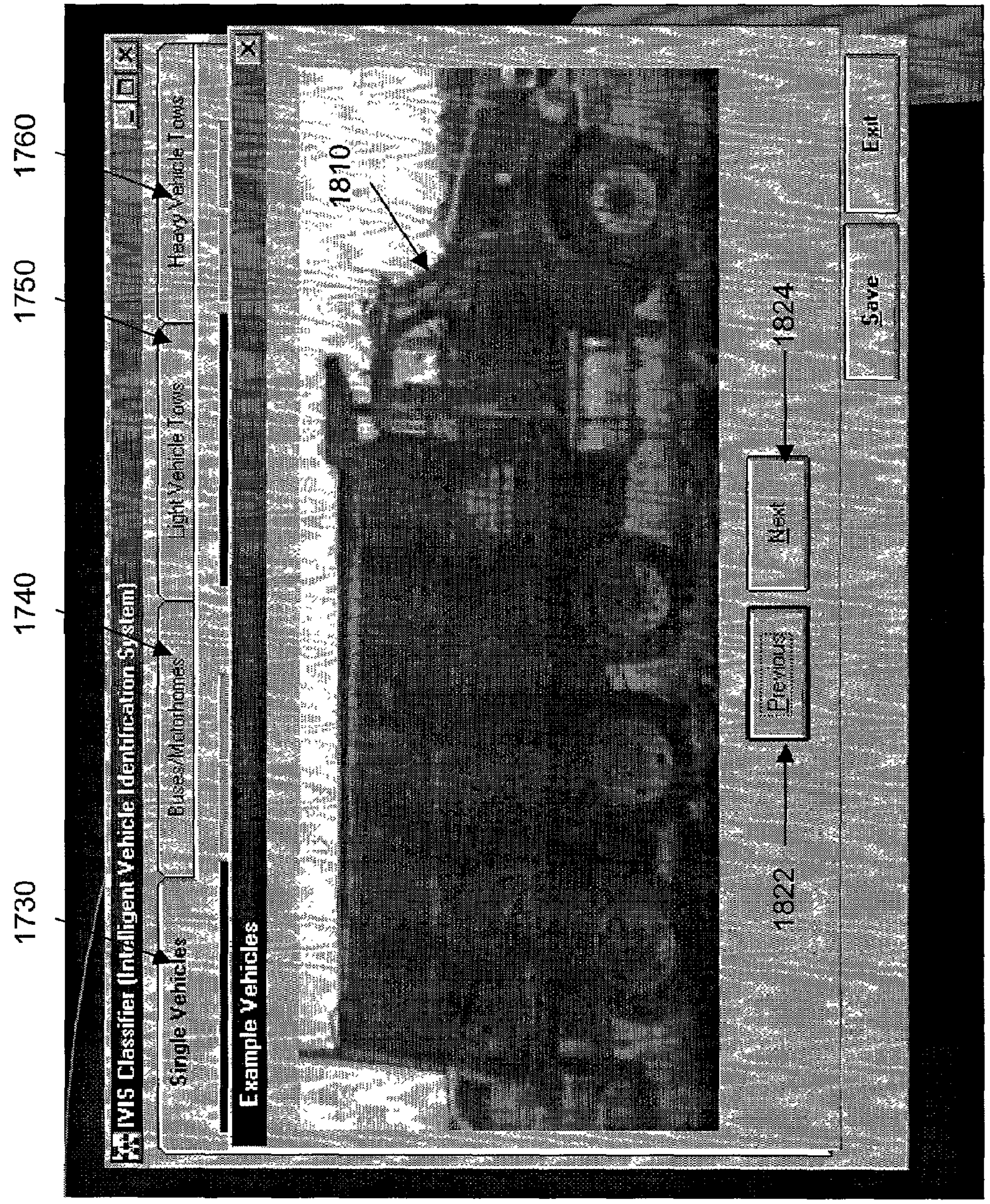
FIG. 18 is a screenshot showing an image of another vehicle category retrievable from a vehicle library that is accessible to an intelligent vehicle identification unit.
Figure 19:
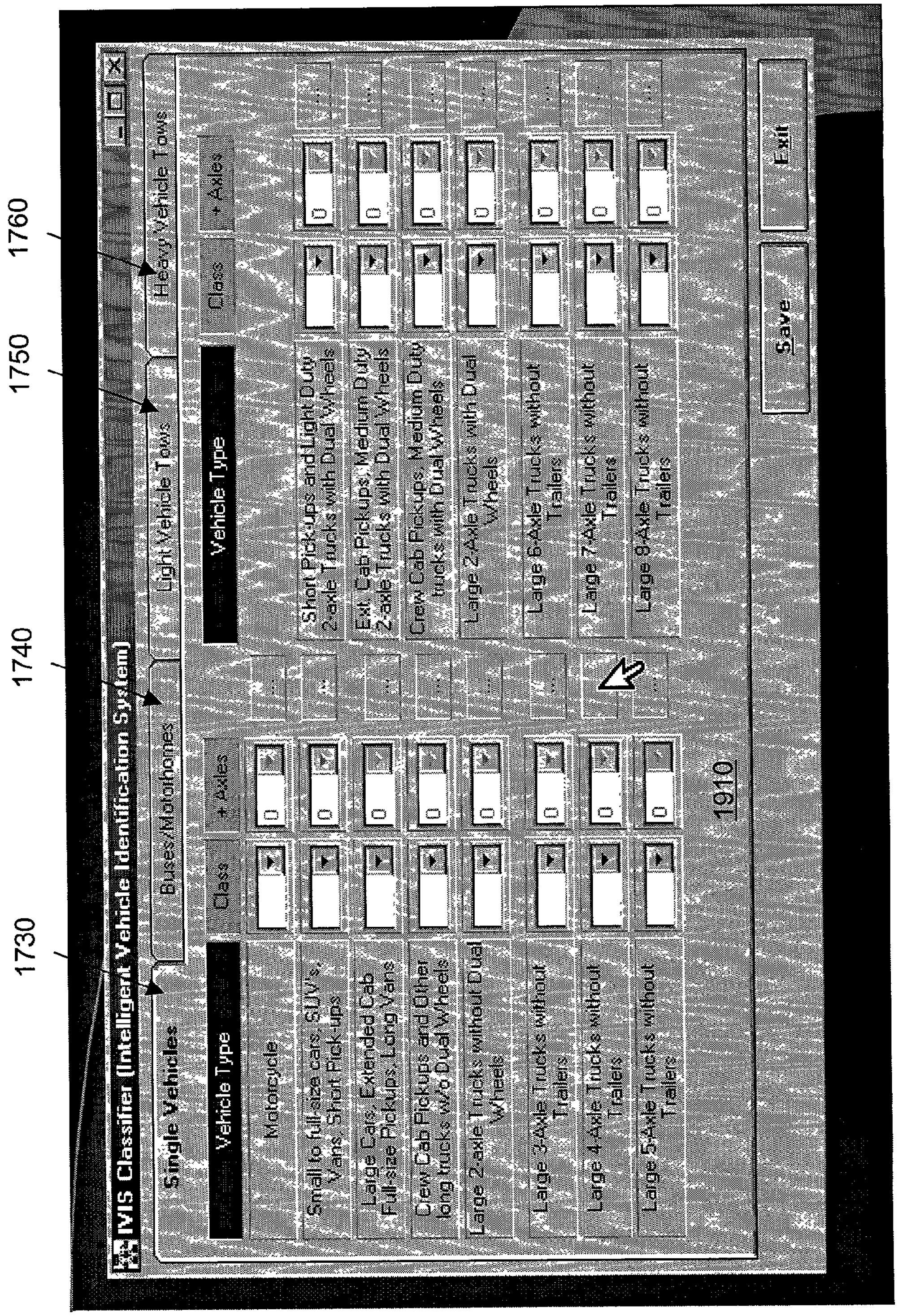
FIG. 19 is a screenshot of the intelligent vehicle identification unit of the present invention, indicating that the vehicle library can be reviewed, updated, or otherwise modified through a graphical user interface.
Figure 20:
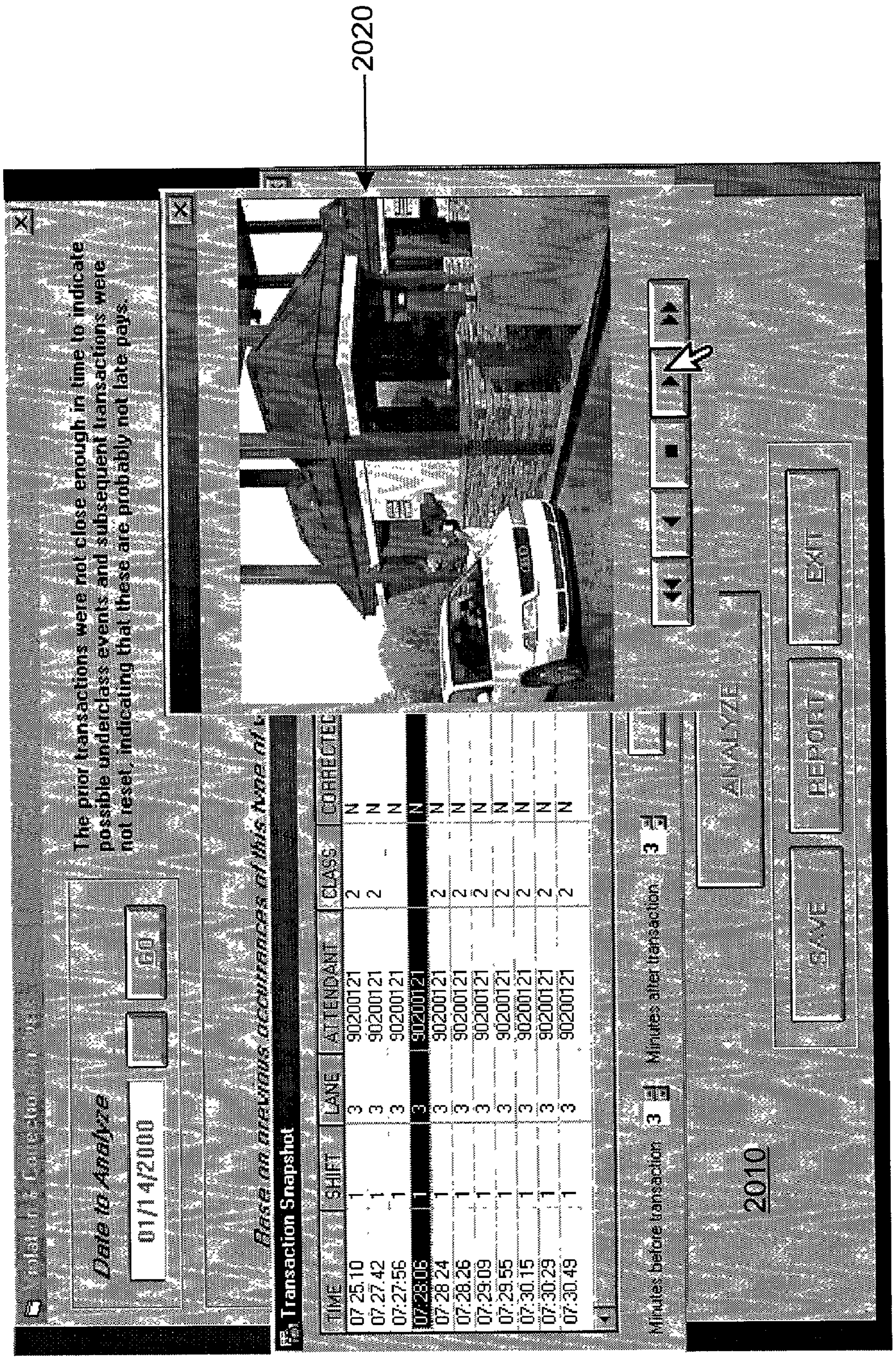
FIG. 20 is a screenshot of the intelligent vehicle identification unit of the present invention, illustrating that details of each transaction record can be stored in a database.

FIG. 16 is a screenshot of display 1510 indicating classification 1612 for vehicle 1520 and fare 1614, which is associated with classification 1612. As indicated on FIG. 16, display 1510 can be adapted to display a number of records associated with a transaction. Areas 1610 comprises fields 1610–1618. Field 1612 can display the class or category of vehicle 1520 as identified using the profile information of vehicle 1520. Field 1614 can be used to display the fare associated with the classification shown in field 1612. In addition, fields 1616 can be used to display an axle count associated with vehicle 1520. Field 1618 can be used to indicate whether the fare has been received at a payment point associated with toll lane 1500.

Area 1620, which comprises fields 1622 through 1632, can be used to display specifics of the transaction. For example, field 1622 is used to indicate that lane 1500 is Lane No. 3 of the particular toll plaza. Field 1624 can be used to indicate which shift of workers is on duty. Fields 1626, 1628 can be used to display the time and date on which the transaction occurs. Field 1630 can be used, for example, to indicate the status of a toll gate or other status of the toll lane. Field 1632 can be used to indicate which, if any, toll attendant is on duty. This information can be used to increase accountability among toll attendants.

In some embodiments, field 1640 can be used to manually operate a toll gate by a toll attendant. In an embodiment in which a toll attendant is staffed at toll lane 1500, field 1650 can be adapted to close the transaction after the toll attendant verifies that the toll has been paid. Field 1660 can be adapted, for example, to be pressed by the toll attendant in a situation in which classification made by the IVIS is verified by the toll attendant. Finally, a toll attendant or an operator of the vehicle can press a field 1670 to obtain a receipt.

Figure 26:
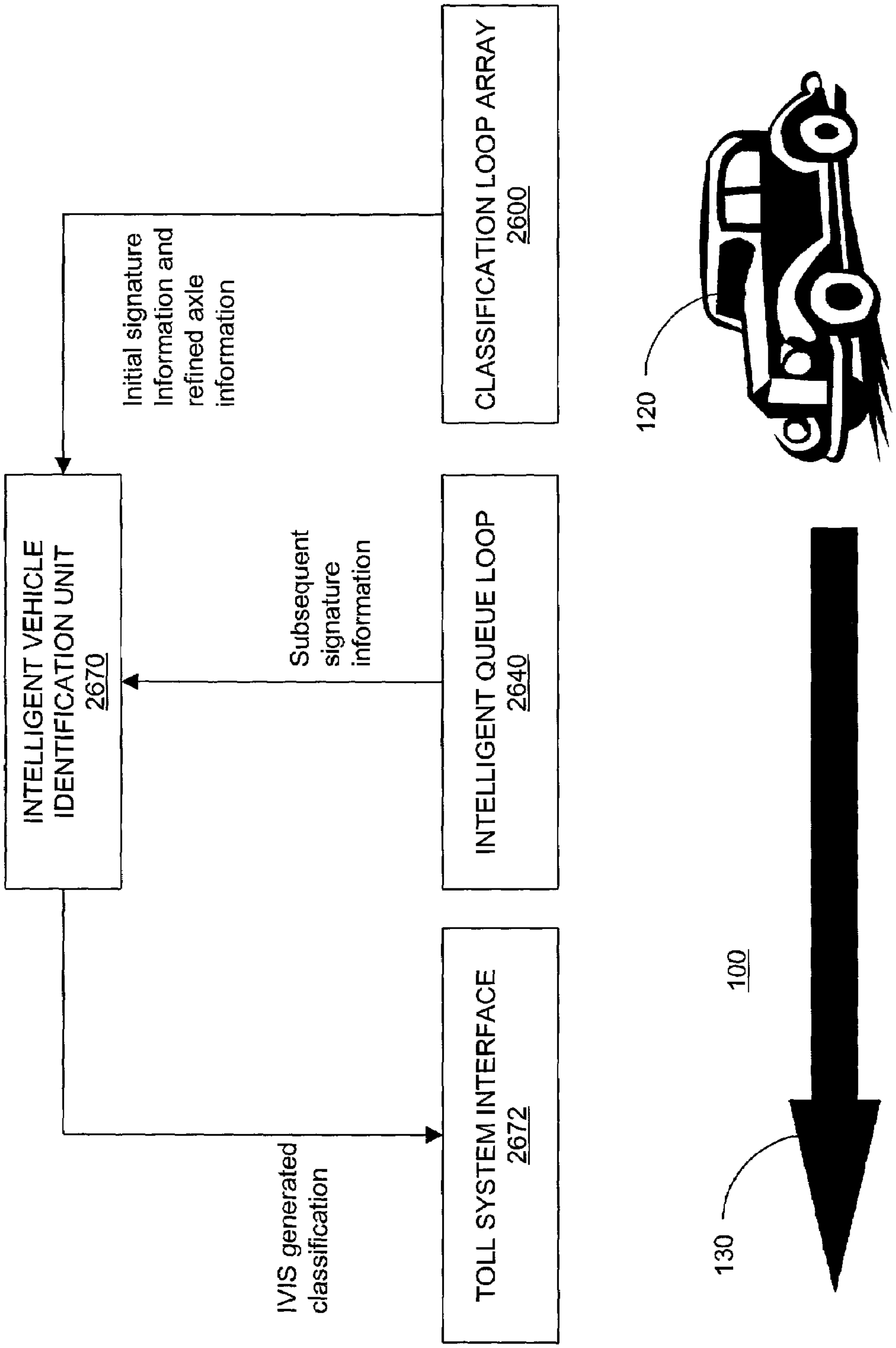
FIG. 26 is a schematic diagram showing the flow of information among various components of the present invention.

In FIG. 26, as vehicle 120 travels in direction 130 along toll lane 100 and passes over classification loop array 2600, vehicle 120's profile information is collected by intelligent vehicle identification unit 2670. Intelligent vehicle identification unit 2670 organizes the raw profile data and generates a classification for vehicle 120. As vehicle 120 then passes over the intelligent queue loop 2640, a second set of profile information is gathered by intelligent vehicle identification unit 2670. This profile is matched with profiles in queue generated by the classification loop array 2600. Intelligent vehicle identification unit 2670 then forwards the proper classification and/or toll amount to toll system interface 2672 as the vehicle approaches the payment point.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art given the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A vehicle classification system comprising:

a payment point;

a classification loop array installed on a surface of a traveling path of a vehicle at a location prior to the payment point, wherein the classification loop array generates profile information characterizing the vehicle when the vehicle travels over the classification loop array;

an intelligent queue loop located between the classification loop array and the payment point, wherein the intelligent queue loop is configured to indicate changes in electromagnetic field which are processed to produce information that is used to ensure that the vehicle is in a proper queue sequence;

a microprocessor for receiving the profile information, wherein the microprocessor uses the profile information to assign a predefined classification to the vehicle, and means for receiving a fare associated with the predefined classification at the payment point.

2. The system of claim 1, wherein the profile information represents changes of inductance which can be interpreted to identify one or more of an axle count of the vehicle, an axle spacing of the vehicle, a speed of the vehicle, and a chassis height of the vehicle.

3. The system of claim 1, further comprising a vehicle library accessible to the microprocessor, wherein the vehicle library comprises the predefined classification.

4. The system of claim 1, wherein the fare is displayed at the payment point.

5. The system of claim 1, wherein the payment point is adapted to notify an operator of the vehicle of the fare.

6. The system of claim 1, wherein the location of the classification loop array is between about 65 feet and about 10 feet from the payment point.

7. The system of claim 1, further comprising a predefined classification listing in sequence of vehicles in queue, wherein the microprocessor dispenses the vehicle's queue in sequence to the operator.

8. A toll collection system comprising:

a classification loop array installed on a surface of a toll lane for sensing a vehicle moving through the toll lane, wherein the classification loop array is adapted to indicate changes in electromagnetic field which can be processed to produce initial signature information and wheel assembly information characterizing the vehicle;

a microprocessor for receiving the initial signature information and the wheel assembly information from the classification loop array, wherein the microprocessor uses the initial signature information and the wheel assembly information to assign a predefined classification to the vehicle;

an intelligent queue loop in communication with the microprocessor, wherein the intelligent queue loop is adapted to indicate changes in electromagnetic field which can be processed to produce subsequent signature information and wheel assembly information characterizing the vehicle, wherein the subsequent signature information is used to reconfirm the initial signature information to ensure that the vehicle is in a proper queue sequence;

means for associating a fare with the vehicle; and means for receiving the fare.

9. The system of claim 8, wherein each of the initial signature information and the subsequent signature information represents changes of inductance which can be interpreted to identify one or more of an axle count of the vehicle, an axle spacing of the vehicle, a speed of the vehicle, and a chassis height of the vehicle.

10. The system of claim 8, wherein the means for receiving is located at a payment point along the toll lane.

11. The system of claim 10, wherein the classification loop array is located at a first distance from the payment point and the intelligent queue loop is located at a second distance from the payment point.

12. The system of claim 8, further comprising means for queuing more than one vehicles in sequence.

13. A toll collection system comprising:

means for generating initial signature information and wheel assembly information characterizing a vehicle that is moving in a toll lane, wherein each of the initial signature information and the wheel assembly information represents changes of inductance which can be interpreted to identify one or more of an axle count of the vehicle, an axle spacing of the vehicle, a speed of the vehicle, and a chassis height of the vehicle;

means for assigning a predefined classification to the vehicle based at least in part on the initial signature information and the wheel assembly information;

an intelligent queue loop configured to indicate changes in electromagnetic field which are processed to produce information that is used to ensure that the vehicle is in a proper queue sequence;

means for determining a fare appropriate for the vehicle; and means for receiving the fare.

14. The system of claim 13, wherein the generating means comprises at least one wheel assembly loop and at least one signature loop, wherein the wheel assembly loop produces the wheel assembly information and the signature loop produces the initial signature information.

15. The system of claim 13, wherein the generating means comprises a left wheel assembly loop and a right wheel assembly loop, wherein the left wheel assembly loop and the right wheel assembly loop are aligned to correspond with a left side and a right side of the vehicle, respectively.

16. The system of claim 13, wherein the generating means comprises a front signature loop, a pair of wheel assembly loops, and a rear signature loop, wherein the pair of wheel assembly loops are located in between the front signature loop and the rear signature loop.

17. The system of claim 13, wherein the generating means comprises a front wheel assembly loop, a signature loop, and a rear wheel assembly loop, wherein the signature loop is located in between the front wheel assembly loop and the rear wheel assembly loop.

18. The system of claim 13, wherein the generating means comprises a bi-symmetrical offset wheel assembly loop characterized by a left member and a right member, wherein the left member and the right member are aligned to correspond with a left side and a right side of the vehicle, respectively.

19. The system of claim 13, further comprising means for verifying a presence of the vehicle at a payment point along the toll lane.

* * * * *